United States Patent
Motoyama et al.

(10) Patent No.: US 7,293,081 B2
(45) Date of Patent: *Nov. 6, 2007

(54) METHOD AND SYSTEM FOR REMOTE DIAGNOSTIC, CONTROL AND INFORMATION COLLECTION BASED ON VARIOUS COMMUNICATION MODES FOR SENDING MESSAGES TO A RESOURCE MANAGER

(75) Inventors: Tetsuro Motoyama, Cupertino, CA (US); Masaichi Niro, Kawasaki (JP)

(73) Assignee: Ricoh Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/660,527

(22) Filed: Sep. 12, 2003

(65) Prior Publication Data

US 2004/0049552 A1 Mar. 11, 2004

Related U.S. Application Data

(63) Continuation of application No. 09/408,443, filed on Sep. 29, 1999, now Pat. No. 6,631,247.

(51) Int. Cl.
*G06F 15/173* (2006.01)
*G06F 7/00* (2006.01)

(52) U.S. Cl. .................. 709/223; 709/224; 709/208

(58) Field of Classification Search ........ 709/223–224, 709/217–219, 208; 700/108, 143; 702/188; 710/18, 19, 40, 44; 714/47–49; 340/825–825.98; 370/346

See application file for complete search history.

(56) References Cited

U.S. PATENT DOCUMENTS 4,251,858 A * 2/1981 Cambigue et al. ............. 700/3

(Continued)

FOREIGN PATENT DOCUMENTS

| JP | 2-172348 | 7/1990 |
| WO | WO 92/22033 | 12/1992 |

OTHER PUBLICATIONS

Newton's Telecom Dictionary: The Official Dictionary of Telecommunications, Harry Newton, 14th Edition Flatiron Publishing, Mar. 1998, ISBN 1-57820-023-7. Definitions: Internet and computer.*

(Continued)

*Primary Examiner*—Zarni Maung
(74) *Attorney, Agent, or Firm*—Oblon, Spivak, McClelland, Maier & Neustadt, P.C.

(57) ABSTRACT

A method, system, and program product for communicating with machines connected to a network. Information sent to or from the machines is transmitted using electronic mail or a via a direct connection. The electronic mail may be transmitted over the Internet to a service center or from a service center to a resource administrator, but also may remain within a local or wide area network for transmission between a machine and a resource administrator. E-mail messages may be transmitted from a computer which is attached to a device which is being monitored or controlled and include information regarding the status, usage or capabilities of the attached device. The device may send status messages and usage information of the device to either a resource administrator or to a service center on the Internet through a firewall. The message may be sent directly to the resource administrator station if urgent service is needed by the device. For routine information, the service center may manage all the resources on an intranet and may send predetermined types of information to the resource administrator using e-mail.

16 Claims, 25 Drawing Sheets

U.S. PATENT DOCUMENTS

| | | | | |
|---|---|---|---|---|
| 5,184,179 A | * | 2/1993 | Tarr et al. | 399/8 |
| 5,282,127 A | * | 1/1994 | Mii | 700/1 |
| 5,412,779 A | | 5/1995 | Motoyama | 399/8 |
| 5,414,494 A | | 5/1995 | Aikens et al. | 399/1 |
| 5,537,554 A | | 7/1996 | Motoyama | 710/100 |
| 5,544,289 A | | 8/1996 | Motoyama | 710/100 |
| 5,568,618 A | | 10/1996 | Motoyama | 710/100 |
| 5,583,615 A | * | 12/1996 | Hashimoto et al. | 399/8 |
| 5,649,120 A | | 7/1997 | Motoyama | 710/100 |
| 5,715,393 A | | 2/1998 | Naugle | 709/224 |
| 5,774,678 A | | 6/1998 | Motoyama | 710/100 |
| 5,897,236 A | * | 4/1999 | Hashimoto et al. | 399/8 |
| 5,901,286 A | * | 5/1999 | Danknick et al. | 709/203 |
| 5,930,342 A | * | 7/1999 | Mazzapica | 379/102.01 |
| 5,935,262 A | * | 8/1999 | Barrett et al. | 714/46 |
| 5,956,487 A | * | 9/1999 | Venkatraman et al. | 709/218 |
| 6,003,070 A | | 12/1999 | Frantz | 709/206 |
| 6,065,136 A | | 5/2000 | Kuwabara | 714/31 |
| 6,308,205 B1 | * | 10/2001 | Carcerano et al. | 709/221 |
| 6,430,711 B1 | | 8/2002 | Sekizawa | 714/47 |
| 6,473,788 B1 | * | 10/2002 | Kim et al. | 709/209 |
| 6,757,714 B1 | | 6/2004 | Hansen | |
| 2004/0049552 A1 | | 3/2004 | Motoyama et al. | |

OTHER PUBLICATIONS

Xerox Corporation News Release entitled "New Xerox Color Laser Printer Taps Internet for Remote Color Printing," May 10, 1999, 2 pages.

IBM Technical Disclosure Bulletin: Dec. 1980:Diagnostic Mode Exercising For Copiers, 80A 06652/37-100, 28-000. P04/B08790361.

IBM Technical Disclosure Bulletin: May 1985:Diagnostic of Copiers Activity in a Copier Monitoring System, 85A 61236/56-200, 37-100. P01/B08830111.

Avesta Technologies Buys Out Caravelle, Communications Today, Phillips Business Information Corporation, ISSN 10849386: Apr. 10, 1998.

IBM Technical Disclosure Bulletin: Dec. 1981: Self Analysis of Copiers Electronics, 82A 00432/71-500, 28-000. P01/B08800137.

U.S. Appl. No. 11/194,689, filed Aug. 2, 2005, Motoyama.
U.S. Appl. No. 11/341,434, filed Jan. 30, 2006, Motoyama et al.
U.S. Appl. No. 11/389,262, filed Mar. 27, 2006, Motoyama.
U.S. Appl. No. 11/437,627, filed May 22, 2006, Motoyama et al.
U.S. Appl. No. 11/544,560, filed Oct. 10, 2006, Motoyama et al.
U.S. Appl. No. 11/544,564, filed Oct. 10, 2006, Motoyama et al.
U.S. Appl. No. 11/544,562, filed Oct. 10, 2006, Motoyama et al.
U.S. Appl. No. 11/544,688, filed Oct. 10, 2006, Motoyama et al.
U.S. Appl. No. 11/546,983, filed Oct. 13, 2006, Motoyama et al.

\* cited by examiner

1. From: entity@domain_name.com Mon March 29 7:20:50 1999
2. Date: Mon 29 March 1999 10:18:19 -0400
3. From: "Service Center" <entity@domain_name.com>
4. To: machine@office.com
5. Subject: Printer Summary Statistics
6. Mime-Version: 1.0
7. Content-...
8.
9. Dear Customer,
10. This message has originated from your printer company.
11.
12. We would like to analyze your printer and obtain summary statistics. Please
13. double-click on the attached executable file which will allow us to
14 analyze your printer and obtain summary statistics.
15.
16. Thank you for your cooperation.
17.
18. Signed, Company X

*FIG. 19A*

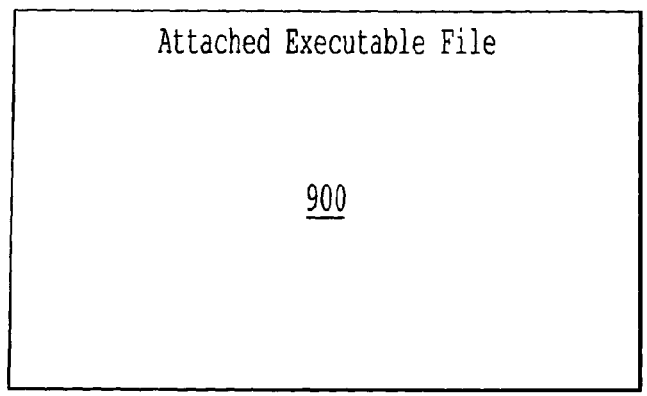

| FROM: | Service Center | CC: | |

TO: machine@office.com

SUBJECT: Printer Statistics

MESSAGE:
Dear Customer:
This message has originated from your printer company.
We would like to analyze your printer and obtain summary statistics. Please double-click on the attached executable file which will allow us to analyze your printer and obtain summary statistics.
Thank you for your cooperation.
Signed, Company X.

ATTACHMENT(S):

SUMMARY.EXE

*FIG. 20*

| Date 1 Jan 2001 Time 0:00 to 1:00 Japan time | | | |
|---|---|---|---|
| Machine | Location | Problem | Notified |
| XXXA1 | CA, USA | Doc. Feeder Jam Freq. Trouble | IKON |
| XXYB2 | UK | Tray Paper In Jam Too Many In Past one week | XXYZ |
| YYZZ3 | Tokyo, Japan | Duplex Jam Last 10 tries | ABCD |

FIG. 26

| Data on FT6650 in USA, YR 1999 | |
|---|---|
| Total Installation | 10,000,000 |
| With Sorter | 6,000,000 |
| Average Copy Job per machine annually | 20,000 |
| Average use of Sorter | 60% |

FIG. 27

METHOD AND SYSTEM FOR REMOTE DIAGNOSTIC, CONTROL AND INFORMATION COLLECTION BASED ON VARIOUS COMMUNICATION MODES FOR SENDING MESSAGES TO A RESOURCE MANAGER

CROSS-REFERENCES TO RELATED APPLICATIONS

The present application is related to U.S. patent applicatin Ser. No. 09/311,148 filed May 13, 1999, entitled "Application Unit Monitoring and Reporting System and Method," U.S. patent application Ser. No. 09/192,583 filed Nov. 17, 1998 entitled "Method and System for Communicating with a Device Attached to a Computer Using Electronic Mail Messages," U.S. patent applicatin Ser. No. 08/883,492 filed Jun. 26, 1997 entitled "Method and System for Diagnosis and Control of Machines Using Connectionless Modes Having Delivery Monitoring and an Alternate Communication Mode," U.S. patent applicatin Ser. No. 08/820,633 filed Mar. 19, 1997 entitled "Method and System to Diagnose a Business Office Device Based on Operating Parameters Set by a User," now U.S. Pat. No. 5,887,216, U.S. patent application Ser. No. 08/733,134 filed Oct. 16, 1996 entitled "Method and System for Diagnosis and Control of Machines Using Connectionless Modes of Communication," now U.S. Pat. No. 5,909,493, U.S. patent applicatin Ser. No. 08/880,683, filed Jun. 23, 1997, U.S. patent application Ser. Nos. 09/107,989 and 09/108,705, both of which were filed Jul. 1, 1998, all three of which are entitled "Method and System for Controlling and Communicating with Machines Using Multiple Communication Formats," and all three of which are divisions of U.S. patent application Ser. No. 08/624,228 filed Mar. 29, 1996, now U.S. Pat. No. 5,818,603, entitled "Method and System for Controlling and Communicating with Machines Using Multiple Communication Formats," U.S. patent application Ser. Nos. 08/738,659 and 08/738,461, both of which are entitled "Method and System for Diagnosis and Control of Machines Using Connection and Connectionless Modes of Communication," filed Oct. 30, 1996, and are divisions of, and U.S. patent applicatin Ser. No. 08/916,009, entitled "Method and System for Diagnosis and Control of Machines Using Connection and Connectionless Modes of Communication," filed Aug. 21, 1997, which is a continuation of, U.S. patent applicatin Ser. No. 08/463,002 filed Jun. 5, 1995, entitled "Method and System for Diagnosis and Control of Machines Using Connection and Connectionless Modes of Communication," now U.S. Pat. No. 5,819,110, and U.S. patent application Ser. No. 08/852,413 filed May 7, 1987, entitled "Method and System for Controlling and Communicating with Business Office Devices," now U.S. Pat. No. 5,774,678, which is a continuation of U.S. patent applicatin Ser. No. 08/698,068 filed Aug. 15, 1996, entitled "Method and Apparatus for Controlling and Communicating With Business Office Devices," now U.S. Pat. No. 5,649,120 which is a continuation of U.S. patent applicatin Ser. No. 08/562,192 filed Nov. 22, 1995, now U.S. Pat. No. 5,568,618, which is a continuation of U.S. patent application Ser. No. 08/473,780 filed Jun. 6, 1995, entitled "Method and Apparatus for Controlling and Communicating With Business Office Devices," now U.S. Pat. No. 5,544,289, which is a continuation of U.S. patent applicatin Ser. No. 08/426,679 filed Apr. 24, 1995, now U.S. Pat. No. 5,537,554, entitled "Method and Apparatus for Controlling and Communicating With Business Office Devices" which is a continuation of U.S. patent applicatin Ser. No. 08/282,168 filed Jul. 28, 1994 and entitled "Method and Apparatus for Controlling and Communicating With Business Office Devices," now U.S. Pat. No. 5,412,779, which is a continuation of U.S. patent application Ser. No. 07/902,462 filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention generally relates to the use of network messages for communicating information to a service center and resource manager regarding the usage of a network resource. The invention is more particularly related to the processing performed within a computer in order to process and forward the appropriate information from the network resource to the service center and resource manager. The invention is further related to a method and system for sending an electronic mail message to the service center and resource manager regarding the network usage of the network resource. Still further, the invention is related to the transmission of a warning message to a resource manager, for example, when urgent service is needed by a network printer. Still further, the invention is related to the transmission of status messages from network printers to a service center, for example, regarding network usage of the network printers so that summary information may be generated and sent to the resource manager regularly.

2. Discussion of the Background

Electronic mail ("e-mail") has become very popular for communicating information between people and provides the benefits of being inexpensive and convenient to a user. Extensive information and protocols are available explaining how e-mail including Internet e-mail operates and there are many commercially available programs for implementing e-mail functions.

Internet facsimile is also available. See, for example, Toyoda, K, Ohno, H., Murai, J., Wing, D., "A Simple Mode of Facsimile Using Internet Mail," March, 1998, The Internet Society, Request For Comments ("RFC") 2305, produced by the Internet Engineering Task Force ("IETF") Fax Working Group, the entire contents of which are incorporated by reference herein.

SUMMARY OF THE INVENTION

Accordingly, it is an object of this invention to provide a method, system, and program product for implementing communication using electronic network messages or email.

It is another object of this invention to provide a method, system, and program product in which a message is received from, processed by, and transmitted to a resource manager which receives the electronic network message or e-mail.

It is yet another object of the invention to provide a method, system, and program product which transmits information originating from a network resource through a service center to a resource manager.

It is yet another object of the invention to provide a method, system, and program product which transmits information originating from a device through a service center to a resource manager.

It is a further object of the invention to provide a method, system, and program product which transmits urgent information originating from a device to a resource manager.

It is yet another object of the invention to provide a method, system, and program product which transmits urgent information regarding a problem with a device, via a message originating from the device, to a resource manager to raise awareness of the problem so that the resource manager may initiate corrective action to resolve the problem.

These and other objects are accomplished by a method, system, and program product in which an electronic network message regarding the status of a network resource is received by a service center or resource manager. When it is determined that urgent service is needed by a network resource, the network resource may send a status message directly to the resource manager. For routine status information, the network resource may send an electronic network message containing information regarding status information of the network resource to the service center for transmission of agreed information. The network resource may be any type of device including a business office device such as a printer, a copier, a scanner, or a facsimile machine, a digital camera, or any other electronic device which is desired to be remotely monitored and/or controlled including equipment for remotely monitoring and controlling utility meters and household appliances. The agreed information may be any type of information relating to the usage of the network resource, including, for example, information relating to paper jams, paper usage, toner usage, energy usage, functionality of device components, and usage frequency.

The invention also relates to the transmission of an outgoing e-mail message from a computer containing information from an attached device. Information from the device may be transmitted to a device driver of the computer and subsequently to a Messaging Application Programing Interface ("MAPI") of the computer. If desired, the transmission of the electronic mail message from the device may establish a TCP ("Transmission Control Protocol") connection between the computer and the device which functions as a message transfer agent. As a further alternative, one or more files may be created within the computer and these files may be written to a mail spool directory of the computer. When the computer detects the existence of the file(s) in the mail spool directory, an e-mail message is transmitted from the computer.

As a further alternative, the network resource may establish direct connections with destinations such as the service center and the resource manager for direct transmission of monitor and control information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19A illustrates an exemplary e-mail message and FIG. 19B illustrates an executable file which may be attached to the e-mail message of FIG. 19A;

FIG. 20 illustrates a screen display of an e-mail message;

FIG. 26 illustrates a log of trouble information which has occurred in various devices;

FIG. 27 illustrates query results of information relating to a specific printer.

DESCRIPTION OF THE PREFERRED EMBODIMENTS

Figure 1:
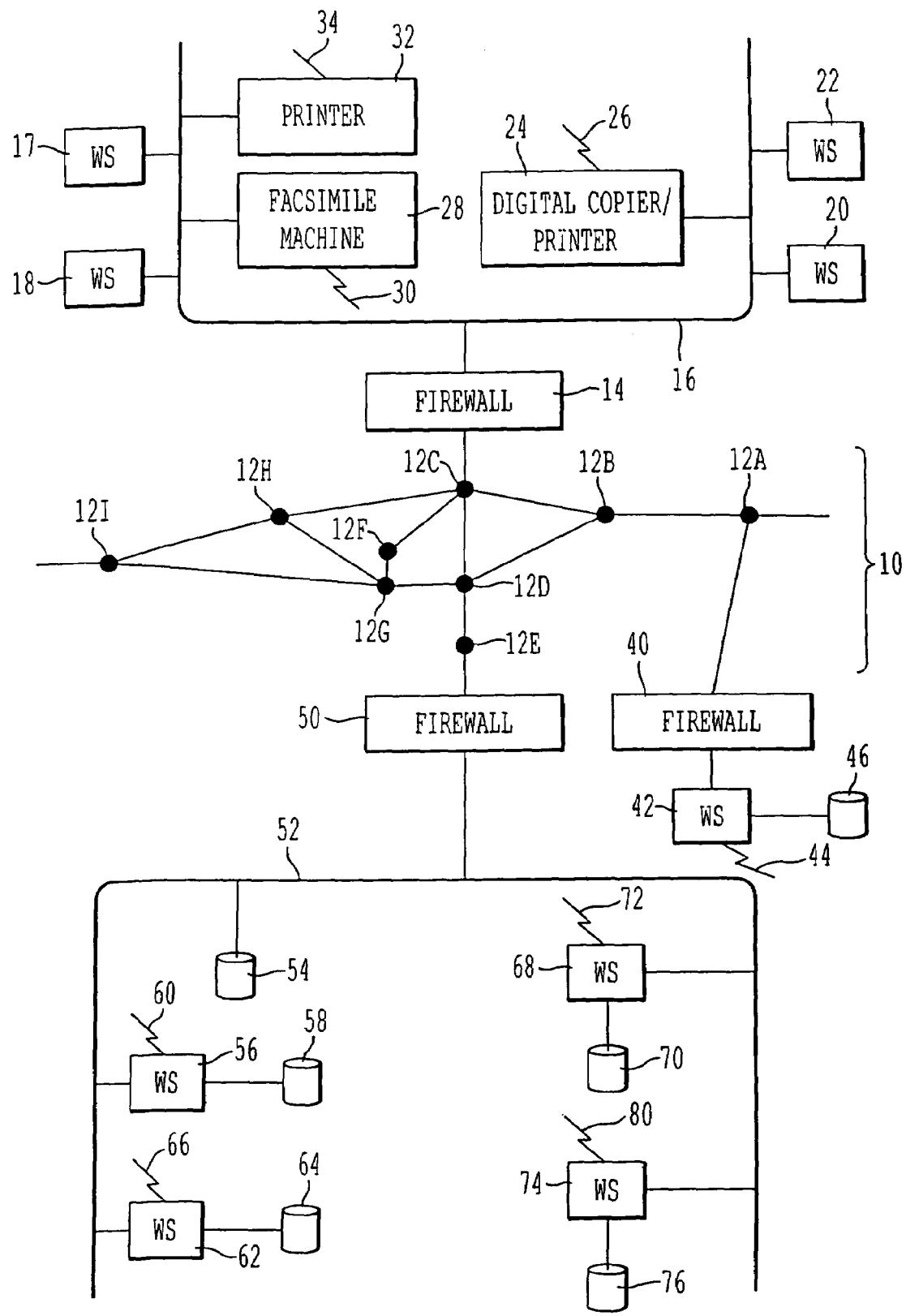
FIG. 1 illustrates three networked business office machines connected to a network of computers and data bases through the Internet.

Referring now to the drawings, wherein like numerals designate identical or corresponding parts throughout the several views, and more particularly to FIG. 1 thereof, there is illustrated a figure showing various machines and computers for monitoring, diagnosing and controlling the operation of the machines. In FIG. 1, there is a first network 16, such as a Local Area Network ("LAN") connected to computer workstations 17, 18, 20 and 22. The workstations can be any type of computers including IBM Personal Computer compatible devices, Unix based computers, or Apple Macintoshes. Also connected to the network 16 are a digital copier/printer 24, a facsimile machine 28, and a printer 32. The devices 24, 28 and 32 are referred to as machines or monitored devices and other types of devices may be used as the machines or monitored devices, including any of the devices discussed below. Also, a facsimile server (not illustrated) may be connected to the network 16 and have a telephone, ISDN (Integrated Services Digital Network), wireless, or cable connection. In addition to the digital copier/printer 24, facsimile machine 28, and printer 32 being connected to the network 16, these devices may also include conventional telephone and/or ISDN and/or cable connections 26, 30 and 34, respectively. As is explained below, the business office machines or business devices 24, 28 and 32 communicate with a remote monitoring, diagnosis and control station, also referred to as a monitoring device, through the Internet via the network 16 or by a direct telephone, ISDN, wireless, or cable connection.

In FIG. 1, the Internet is generally designated by 10. The Internet 10 includes a plurality of interconnected computers and routers designated by 12A-12I. The manner of communicating over the Internet is known through Request For Comments ("RFC") documents obtained by file transfer protocol ("FTP") at NIC.DDN.MIL or at FTP NISC.SRI.COM. TCP/IP (Transmission Control Protocol/Internet Protocol) related communication is described for example in the book "TCP/IP Illustrated," Vol. 1, The Protocols, by Stevens, from Addison-Wesley Publishing Company, 1994, which is incorporated herein by reference.

In FIG. 1, a firewall 14 is connected between the Internet 10 and the network 16. A firewall is a device that allows only authorized computers to access a network or other computer via the Internet. Firewalls are known and commercially available devices and/or software, for example, include SunScreen from Sun Microsystems Inc. Similarly, a firewall 50 is connected between the Internet 10 and a network 52. Also, a firewall 40 is connected between the Internet 10 and a workstation 42.

The network 52 is a conventional network and includes a plurality of workstations 56, 62, 68 and 74. These workstations may be different departments within a company such as marketing, manufacturing, design engineering and customer service departments. In addition to the workstations connected via the network 52, there is a workstation 42 which is not directly connected to the network 52. Information in a data base stored in a disk 46 may be shared using proper encryption and protocols over the Internet to the workstations connected directly to the network 52. Also, the workstation 42 includes a direct connection to a telephone line and/or ISDN and/or cable 44 and the data base in disk 46 may be accessed through the telephone line, ISDN, or cable. The cable used by this invention may be implemented using a cable which typically is used to carry television programming, cable which provides for high speed communication of digital data typically used with computers or the like, or may be implemented using any desired type of cable.

Information of the business office machines 24, 28 and 32 may be stored in one or more of the data bases stored in the disks 46, 54, 58, 64, 70 and 76. Each of the customer service, marketing, manufacturing, and engineering departments may have their own data base or may share from one or more data bases. Each of the disks used to store data bases is a non-volatile memory such as a hard disk or optical disk. Alternatively, the data bases may be stored in any storage device including solid state and/or semiconductor memory devices. As an example, disk 64 contains the marketing data base, disk 58 contains the manufacturing data base, disk 70 contains the engineering data base and disk 76 contains the customer service data base. Alternatively, the disks 54 and 46 store one or more of the data bases.

In addition to the workstations 56, 62, 68, 74 and 42 being connected to the Internet, these workstations may also include a connection to a telephone line, ISDN, or cable which provides a secure connection to the machine being monitored, diagnosed and/or controlled and is used during a connection-mode of communication. Additionally, if one of the Internet, telephone, ISDN, or cable is not operating properly, one of the others can be automatically used for communication.

A feature of the present invention is the use of a connectionless-mode of communication (e.g., Internet e-mail) or transmission between a machine and a computer for monitoring, diagnosing and controlling the machine. Alternatively, the e-mail which is transmitted may be implemented using a connection mode of communication. The IBM Dictionary of Computing by George McDaniel, 1994, defines a connectionless-mode transmission to be the transmission of a single unit of data from a source service access point to one or more destination service access points without establishing a connection. The IBM Dictionary also defines a connection-mode transmission to be the transmission of units of data from a source service access point to one or more destination service access points via a connection. The connection is established prior to data transfer and released following data transfer. Additional information about the connection-mode and the connectionless-mode of operation is described in the Handbook of Computer-Communications Standards, Vol. 1, 2nd Edition, by William Stallings, 1990, which is incorporated herein by reference. In order to transfer data from one DTE (Data Terminal Equipment) to another DTE, there is a unique identifier or address for each DTE. This unique identifier or address is usable in both connection-modes and connectionless-modes of communication.

Figure 2:
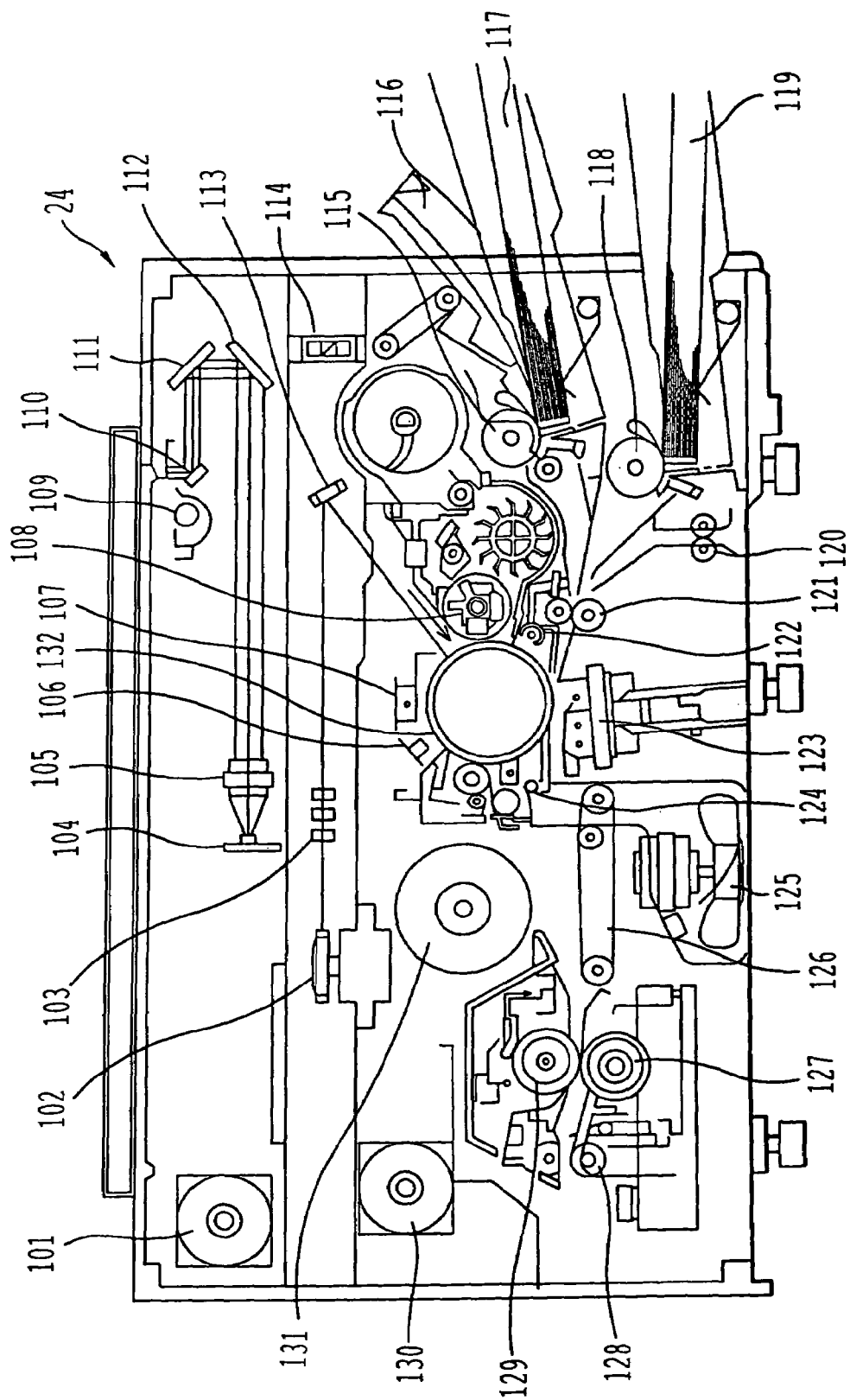
FIG. 2 illustrates the components of a digital copier/printer.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an Fθ lens used to collimate light from a laser (not illustrated). Reference numeral 104 designates a sensor for detecting light from the scanner, 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illustrate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
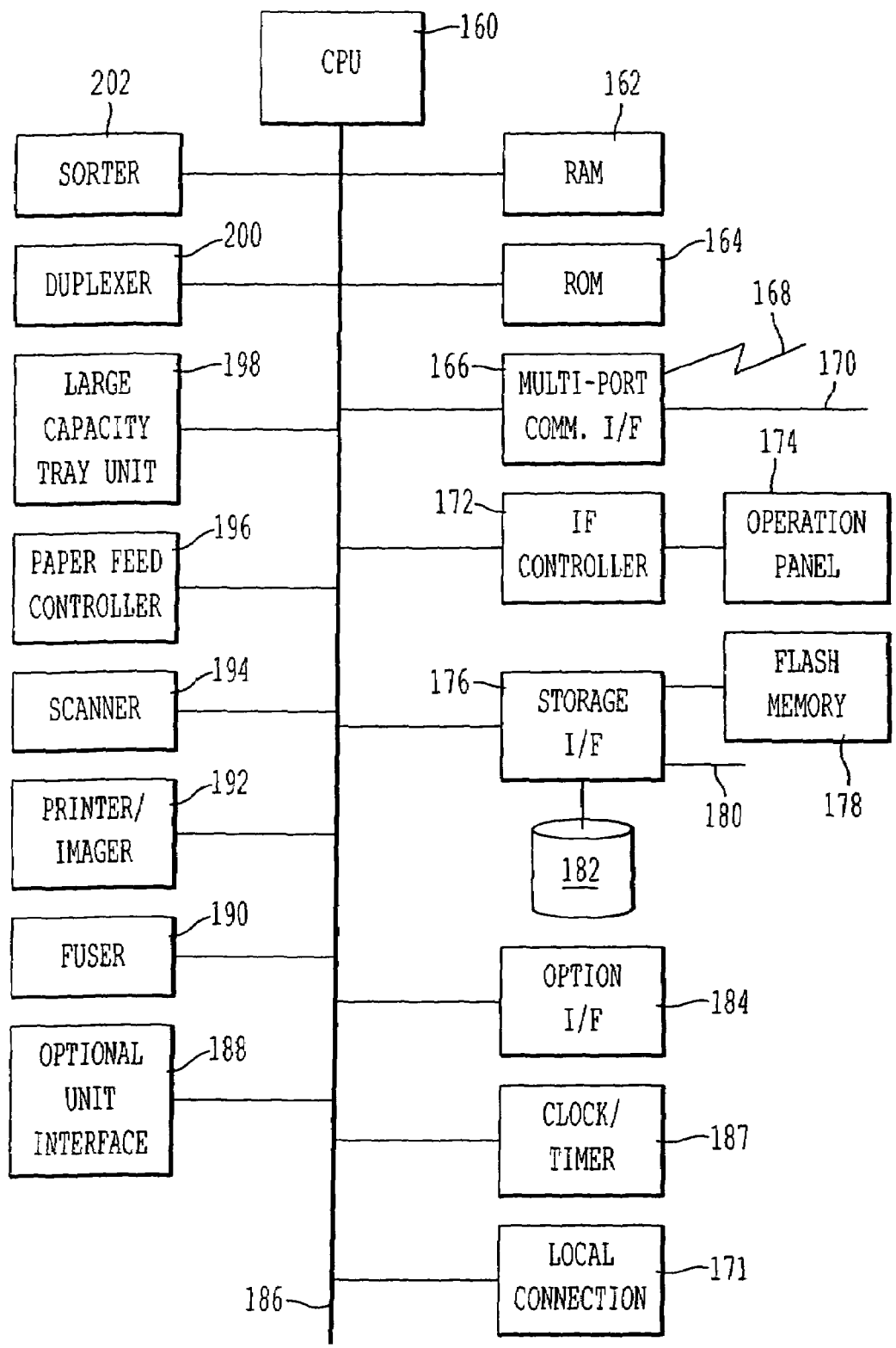
FIG. 3 illustrates the electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only memory 164 stores the program code used to run the digital copier and also information describing the copier (static-state data) such as the model number, serial number of the copier, and default parameters.

There is a multi-port communication interface 166 which allows the digital copier to communicate with external devices. Reference numeral 168 represents a telephone, ISDN, or cable line and 170 represents a network. Further information of the multi-port communication interface is described with respect to FIG. 4. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display may be included within the operation panel 174 to display parameters and messages of the digital copier to a user.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier. A clock/timer 187 is utilized to keep track of both the time and date and also to measure elapsed time.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 194 is used to scan images into the digital copier and includes conventional scanning elements such as a light, mirror, etc. Additionally, scanner sensors are used such as a home position sensor to determine that the scanner is in the home position and a lamp thermistor to ensure proper operation of the scanning lamp. There is a printer/imager 192 which prints the output of the digital copier and includes a conventional laser printing mechanism, a toner sensor, and an image density sensor. A fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital copier such as an automatic document feeder, a different type of sorter/collator, or other elements which can be added to the digital copier.

Figure 4:
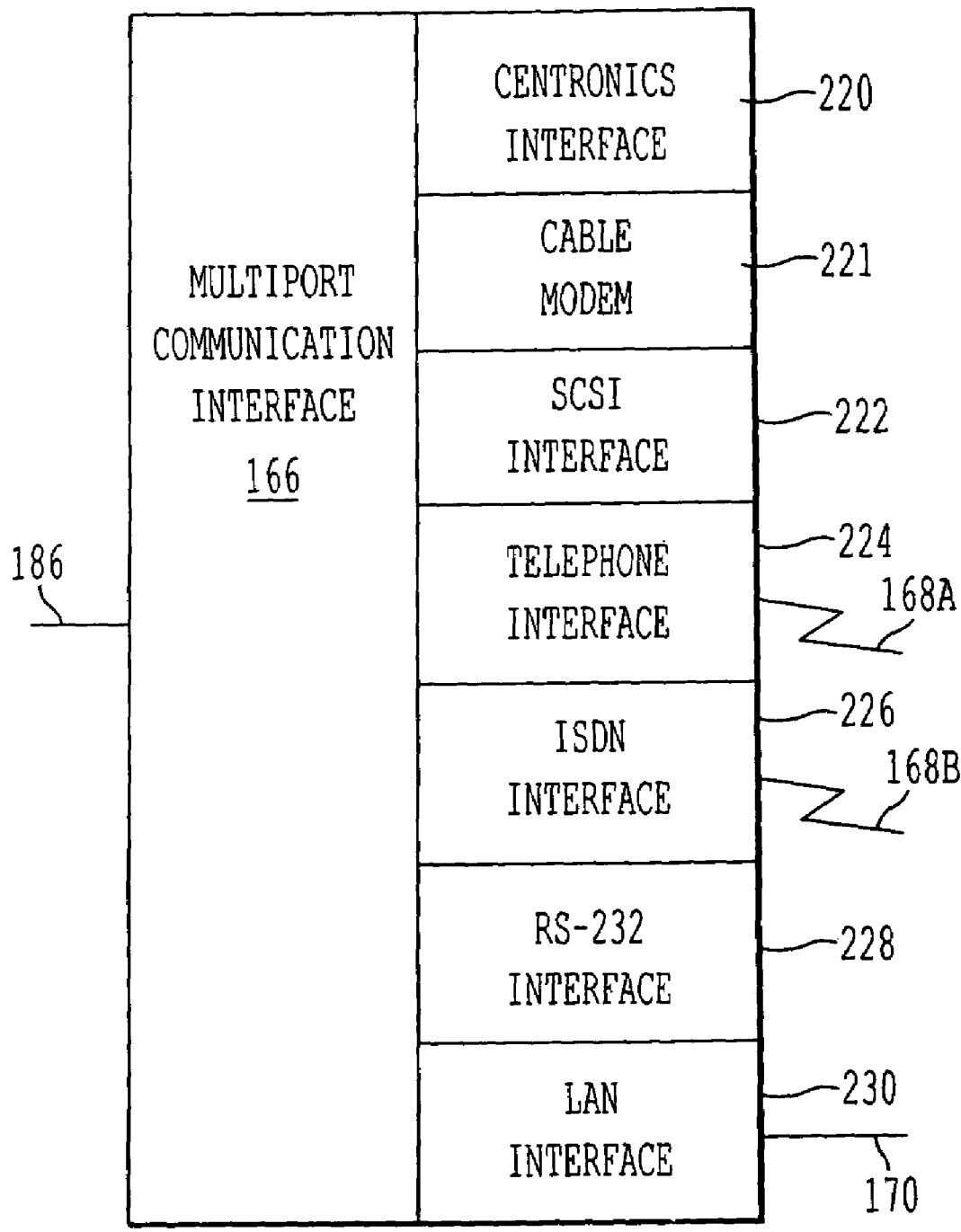
FIG. 4 illustrates details of the multi-port communication interface illustrated in FIG. 3.

FIG. 4 illustrates details of the multi-port communication interface 166. The digital copier may communicate to external devices through a Centronics interface 220 which receives or transmits information to be printed, a cable modem unit 221 which has a high speed connection over cable, a SCSI interface 222, a conventional telephone interface 224 which connects to a telephone line 168A, an ISDN interface 226 which connects to an ISDN line 168B, an RS-232 interface 228, and a LAN interface 230 which connects to a LAN 170. A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory 178 or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines or devices such as an analog copier, a facsimile machine, a scanner, a printer, a facsimile server, or other business office machines, or an appliance with which a user interfaces such as a microwave oven, VCR, digital camera, cellular phone, palm top computer, etc. Additionally, the present invention includes other types of machines which operate using a connection-mode or connectionless-mode of communication, and also e-mail, such as a metering system including a gas, water, or electricity metering system, vending machines, or any other device which performs mechanical operations, such as automobiles, and has a need to be monitored, and performs a function. In addition to monitoring special purpose machines, and computers, the invention can be used to monitor, control, and diagnose a general purpose computer which would be the monitored and/or controlled device.

Figure 5:
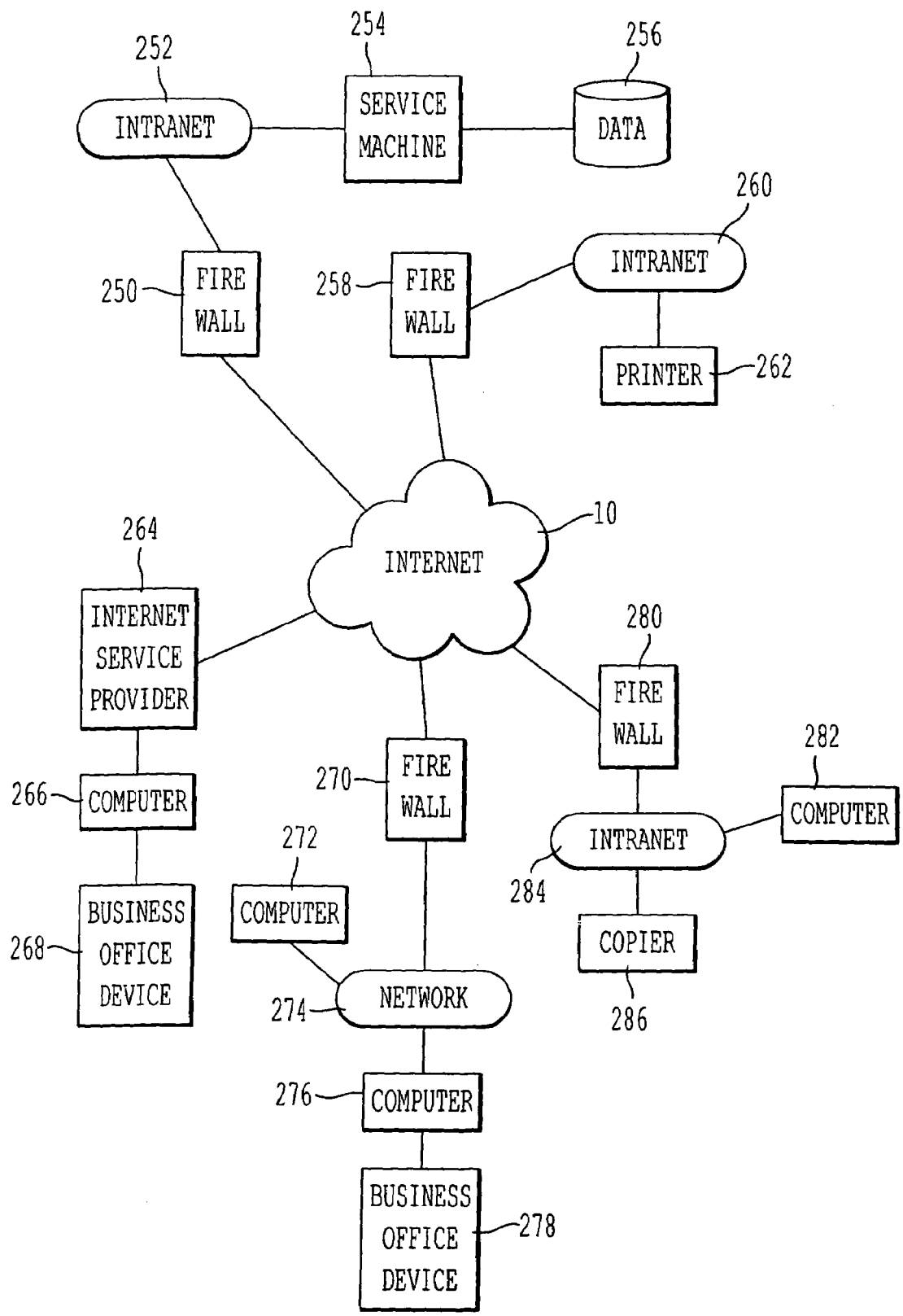
FIG. 5 illustrates an alternative system configuration in which business office devices are connected to a computer which is connected to a network, and also devices which are connected directly to the network.

FIG. 5 illustrates an alternative system diagram of the invention in which different devices and sub-systems are connected to the Internet 10. However, there is no requirement to have each of these devices or sub-systems as part of the invention but any individual component or subsystem illustrated in FIG. 5 is also part of the invention. Further, the elements illustrated in FIG. 1 may be connected to the Internet 10 which is illustrated in FIG. 5. In FIG. 5, there is illustrated a fire wall 250 connected to an intranet 252. One of the computers or devices connected to the intranet 252 is a service machine 254 which includes therein or has connected thereto data 256 which may be stored in a data base format. The data 256 includes history, performance, malfunction, and any other information including statistical information of the operation or failure or set-up and components or optional equipment of devices which are being monitored. The service machine 254 may be implemented as the device or computer which requests the monitored devices to transmit data or which requests that remote control and/or diagnosis tests be performed on the monitored devices. The service machine 254 may be implemented as any type of device and is preferably implemented using a computerized device such as a general purpose computer.

Another sub-system of FIG. 5 includes a fire wall 258, an intranet 260, and a printer 262 connected thereto. In this sub-system, there is not a separate general purpose computer connected between the intranet 260 (or a different type of computer network) but the functions of sending and receiving electronic mail messages by the printer 262 (and similarly by a copier 286) are performed by circuitry, a microprocessor, or any other type of hardware contained within or mounted to the printer 262.

An alternate type of sub-system includes the use of an Internet service provider 264 which may be any type of Internet service provider including known commercial companies such as America Online, Netcom, CompuServe, Niftyserve, the Internet service provider Erols, or any other Internet service provider. In this sub-system, a computer 266 is connected to the Internet service provider 264, through a modem, for example, such as a telephone line modem, a cable modem, modems which use any type of wires such as modems used over an ISDN (Integrated Services Digital Network) line, ASDL (Asymmetric Digital Subscriber Line), modems which use frame relay communication, any digital or analog modem, wireless modems such as a radio frequency modem, a fiber optic modem, or a device which uses infrared light waves. Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water, or gas utility meter, or any other device discussed herein.

Also illustrated in FIG. 5 is a fire wall 270 connected to a network 274. The network 274 may be implemented as any type of computer network, such an Ethernet network, for example. Networking software which may be used to control the network includes any desired networking software including software commercially available from Novell or Microsoft. The network 274 may be implemented as an Intranet, if desired. A computer 272 connected to the network 274 may be used to obtain information from a business office device 278 and generate reports such as reports showing problems which occurred in various machines connected to the network and a monthly usage report of the devices connected to the network 274. In this embodiment, a computer 276 is connected between the business office device 278 and the network 274. This computer receives e-mail communications from the network and forwards the appropriate commands or data, or any other information, to the business office device 278. While it has been stated that the business office device 278 is connected to the computer 276, there is no requirement for a wired connection between the business office device and the computer and communication between the business office device 278 and the computer 276 may be accomplished using wires or wireless methods including through the use of radio frequency connections and light connections which may be through an infrared connection, or through fiber optics. Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless network which is disclosed in the Bluetooth Specification which is described at the world wide web site www.bluetooth.com, which is incorporated herein by reference.

Another sub-system illustrated in FIG. 5 includes a fire wall 280, an intranet 284, a computer 282 connected thereto, and a copier 286. The computer 282 may be used to generate reports and request diagnostic or control procedures. These diagnostic and control procedures may be performed with respect to the copier 286 or any of the other devices illustrated in or used with FIG. 5. While FIG. 5 illustrates a plurality of fire walls, the fire walls are preferable but optional equipment and therefore the invention may be operated without the use of fire walls, if desired.

Figure 6A:
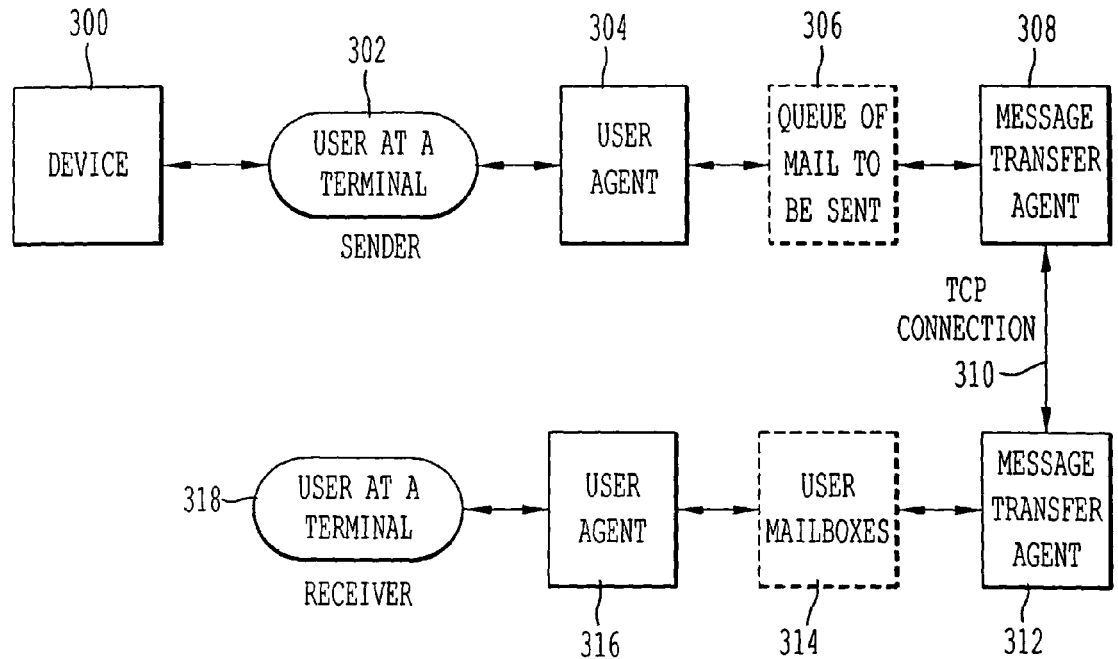
FIG. 6A illustrates in block diagram format a manner in which information may be communicated to or from a device using electronic mail.
Figure 28:
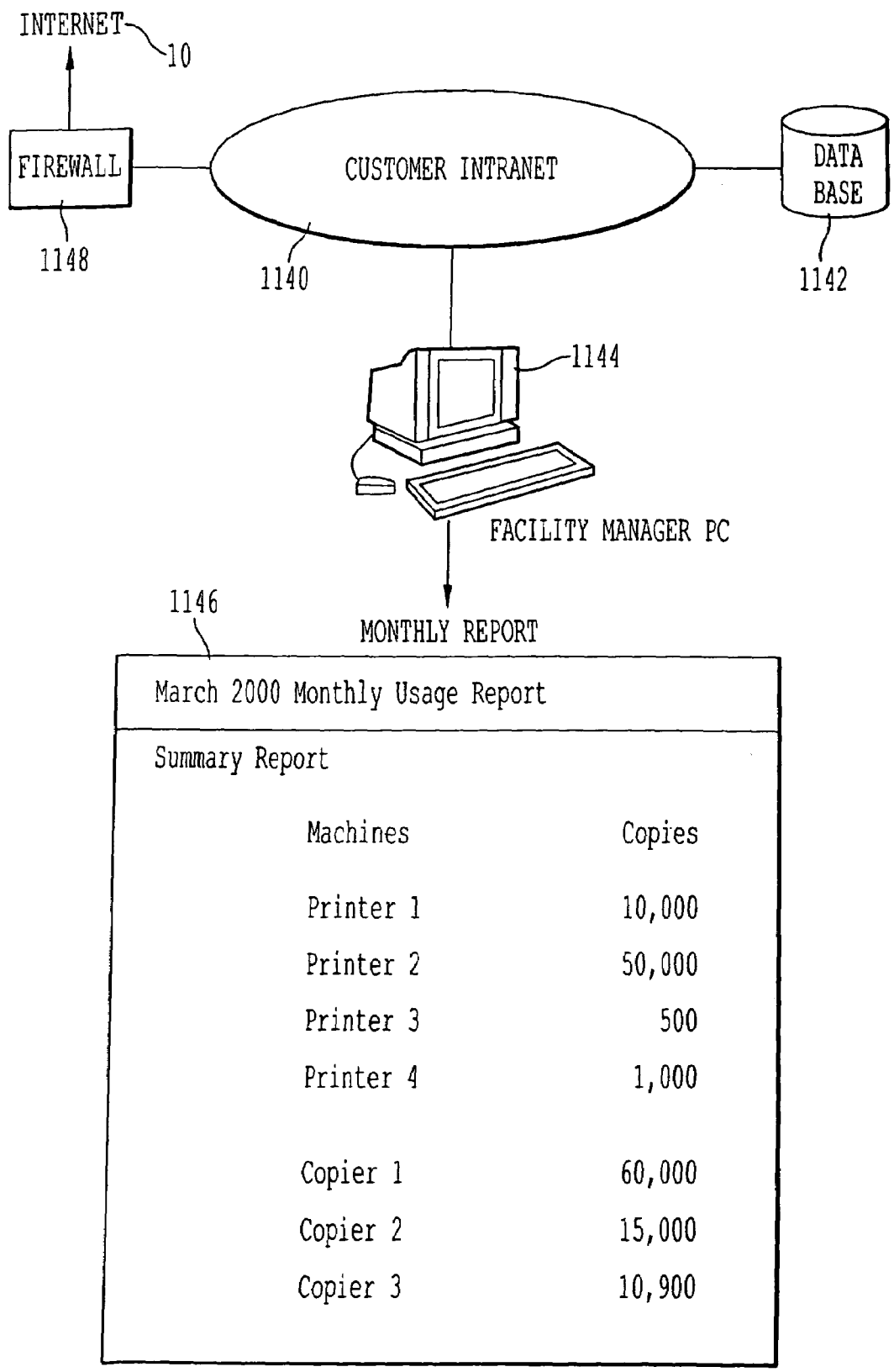
FIG. 28 illustrates an intranet with a resource administrator generating a usage report.

FIG. 6A illustrates a device 300 connected to a typical e-mail exchange system which includes components 302, 304, 306, 308, 310, 312, 314, 316, and 318 which may be implemented in a conventional manner and are taken from FIG. 28.1 of Stevens, above. The device 300 may be any of the devices described herein and the user at a terminal 302 may correspond to any of the illustrated computers, such as the computer 276 illustrated in FIG. 5. While FIG. 6A illustrates the user at a terminal 302 as being a sender, the sending and receiving functions may be reversed in FIG. 6A. Further, if desired, there may not be a need for having a user at the terminal. Connected to the user at a terminal 302 is the user agent 304. Popular user agents for Unix include MH, Berkeley Mail, Elm, and Mush. The user agent creates e-mail messages to be sent and if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP (Transfer Communication Protocol) connection or a TCP/IP (Internet Protocol) connection or protocol. It is to be noted that the communication between the message transfer agents 308 and 312 may occur over the Internet, but alternatively may occur over any type of connection including any network connection such as a local area network, wide area network and/or an intranet. Further, any desired connection between the message transfer agents 308 and 312 may be utilized.

From the message transfer agents 312, e-mail messages are stored in user mailboxes 314 which are transferred to the user agent 316 and ultimately transmitted to the user at a terminal 318 which functions as a receiving terminal.

The TCP provides a connection-mode of transmission. However, a direct connection is usually not established between the sending terminal 302 and receiving terminal 318. Thus, the transmission of an electronic mail message may be considered a connectionless-mode of communication when it is being referred to as between two users or terminals, but when considering the transfer between MTAs, the communication is usually a connection-mode of communication.

As the Internet is a network accessible by many people and organizations, it is not considered to be secure. Therefore, messages transmitted over the Internet should be encrypted to keep the messages confidential. Encryption mechanisms are known and commercially available which may be used with the present invention. For example, a C library function, crypt(), is available from Sun Microcomputers for use with the Unix operating system, and other encryption and decryption routines are known and commercially available and may also be used with this invention.

Figure 6B:
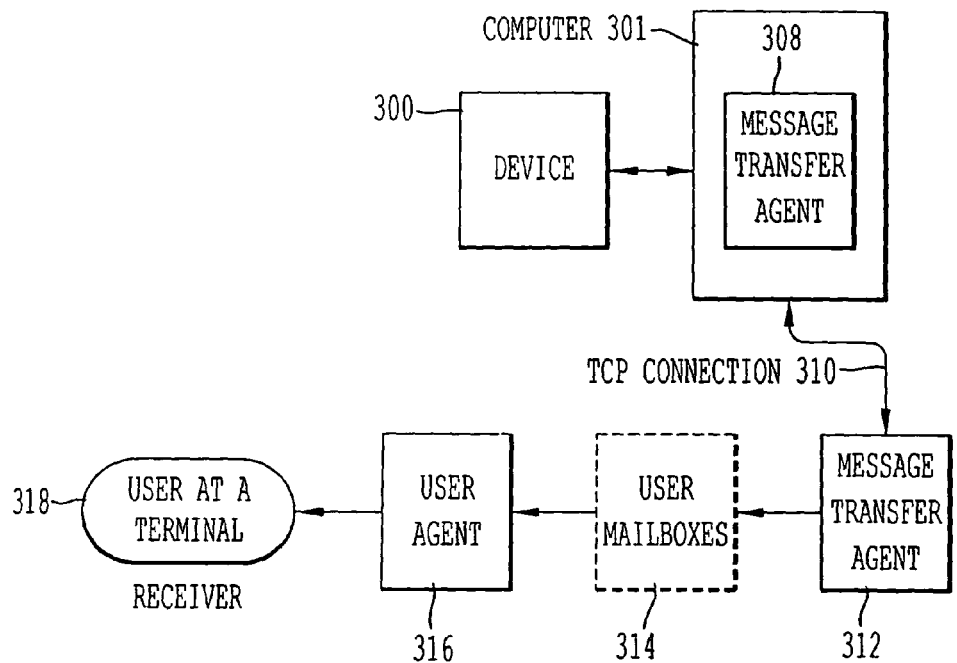
FIG. 6B illustrates an alternative way of communicating using electronic mail in which the computer which is connected to the device also serves as a message transfer agent.

As an alternative to the general structure of FIG. 6A, a single computer may be used which functions as the user terminal, and also the message transfer agent. As illustrated in FIG. 6B, the device 300 is connected to a computer 301 which includes the message transfer agent 308. If desired, the other components on the sending side of FIG. 6A may be included in the computer 301 of FIG. 6B including the user agent 304 and the queue of mail to be sent 306.

Figure 6C:
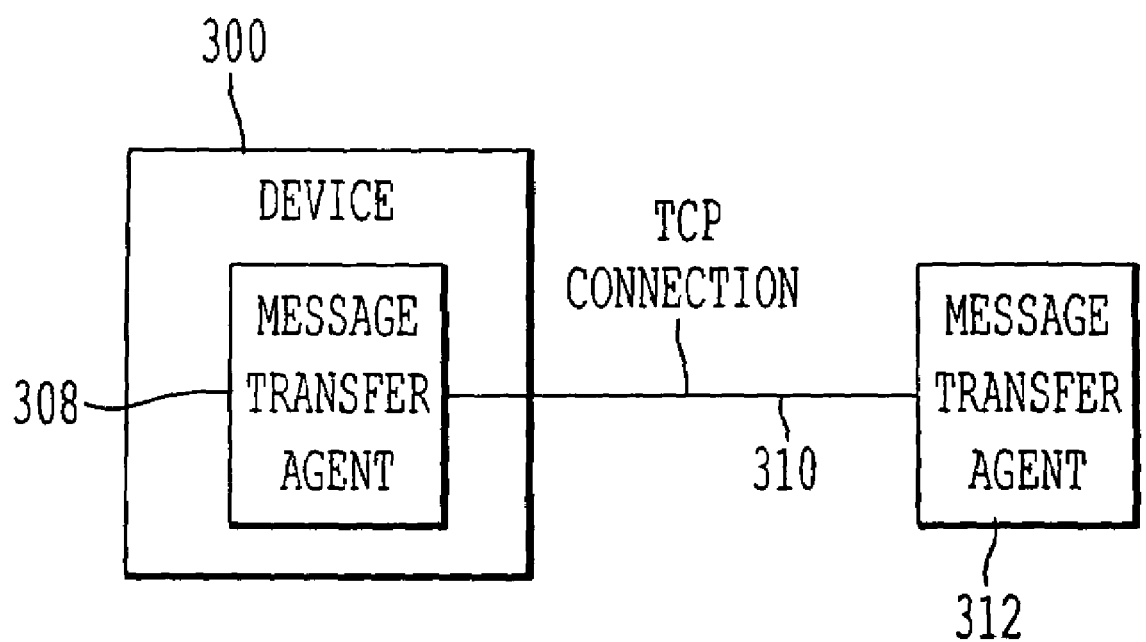
FIG. 6C illustrates an alternative way of communicating using electronic mail in which the device includes a message transfer agent.

A further alternative structure is shown in FIG. 6C in which the message transfer agent 308 is formed as part of the device 300. Further, the message transfer agent 308 is connected to the message transfer agent 312 by the TCP connection 310. This embodiment of FIG. 6C illustrates a case in which the device 300 is directly connected to the TCP connection 310 and has an e-mail capability. A common instance of this embodiment of FIG. 6C may be the device 300 is a facsimile machine with an e-mail capability of RFC 2305 (a simple mode of facsimile using Internet mail).

Figure 7:
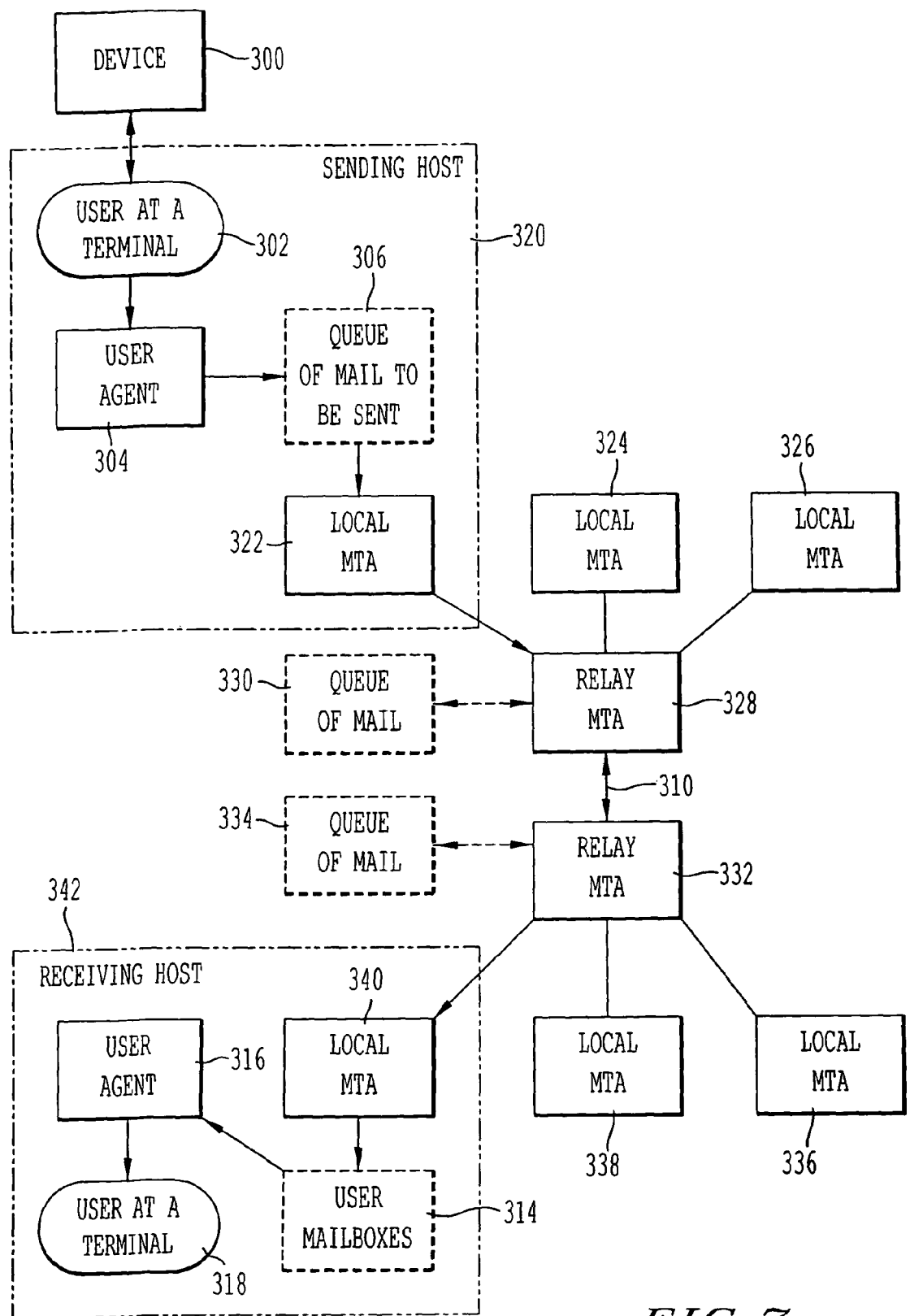
FIG. 7 illustrates an alternative manner of sending messages across the Internet.

FIG. 7 illustrates an alternative implementation of transferring mail and is based on FIG. 28.3 of Stevens. FIG. 7 illustrates an electronic mail system having a relay system at each end. The arrangement of FIG. 7 allows one system at an organization to act as a mail hub. In FIG. 7, there are four MTAs connected between the two user agents 304 and 318. These MTAs include local MTA 322, relay MTA 328, relay MTA 332, and local MTA 340. The most common protocol used for mail messages is SMTP (Simple Mail Transfer Protocol) which may be used with this invention, although any desired mail protocol may be utilized. In FIG. 7, 320 designates a sending host which includes the user at a terminal 302, the user agent 304, and the local MTA 322. The device 300 is connected to, or alternatively included within, the sending host 320. As another case, the device 300 and host 320 can be in one machine where the host capability is built into the device 300. Other local MTAs include local MTA 324 and 326. Mail to be transmitted and received may be queued in a queue of mail 330 of the relay MTA 328. The messages are transferred across the TCP connection 310, which may be, for example, the Internet, or may be any other type of network or connection.

The transmitted messages are received by the relay MTA 332 and if desired, stored in a queue of mail 334. The mail is then forwarded to the local MTA 340 of a receiving host 342. The mail may be placed in one or more of the user mailboxes 314 and subsequently forwarded to the user agent 316 and finally forwarded to the user at a terminal 318. If desired, the user may not be required to be at the terminal and the mail may be directly forwarded to the terminal without user interaction. Other local MTAs at the receiving side include MTA 338 and local MTA 336 which may have their own mailboxes, user agents, and terminals.

Figure 8:
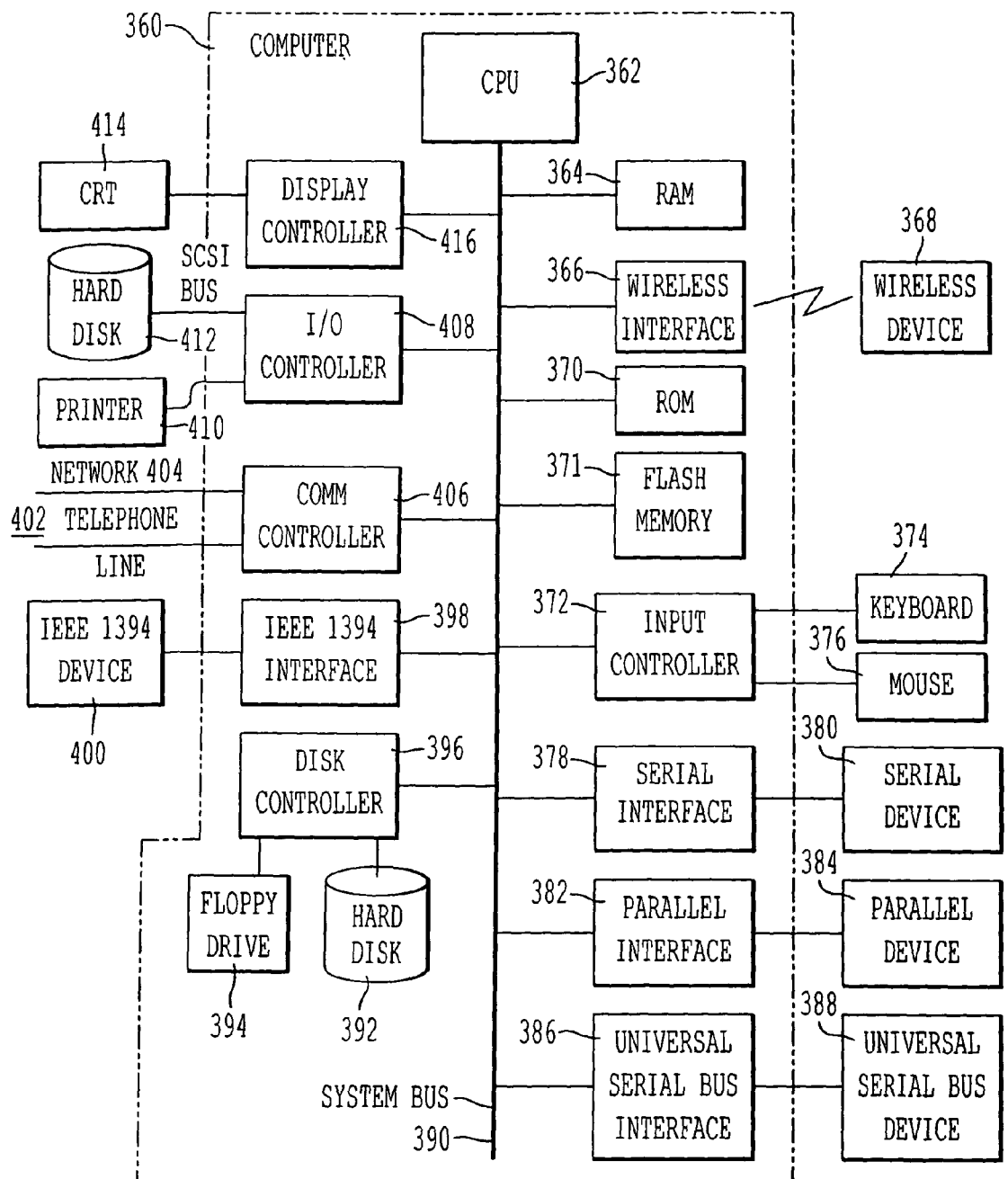
FIG. 8 illustrates an exemplary computer which may be connected to the device and used to communicate electronic mail messages.

The various computers utilized by the present invention including the computers 266 and 276 of FIG. 5 may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of these computers. In FIG. 8, the computer 360 includes a CPU 362 which may be implemented as any type of processor including commercially available microprocessors from companies such as Intel, Motorola, Hitachi and NEC, for example. There is a working memory such as a RAM 364, and a wireless interface 366 which communicates with a wireless device 368. The communication between the interface 366 and device 368 may use any wireless medium such as radio waves, or light waves, for example. The radio waves may be implemented using a spread spectrum technique such as Code Division Multiple Access ("CDMA") communication or using a frequency hopping technique such as that disclosed in the Bluetooth specification.

There is a ROM 370, and a flash memory 371, although any other type of nonvolatile memory may be utilized in addition to or in place of the flash memory 371 such as an EPROM, or an EEPROM, for example. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 406 allows the computer 360 to communicate with other computers, or send e-mail messages, for example over a telephone line 402, or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
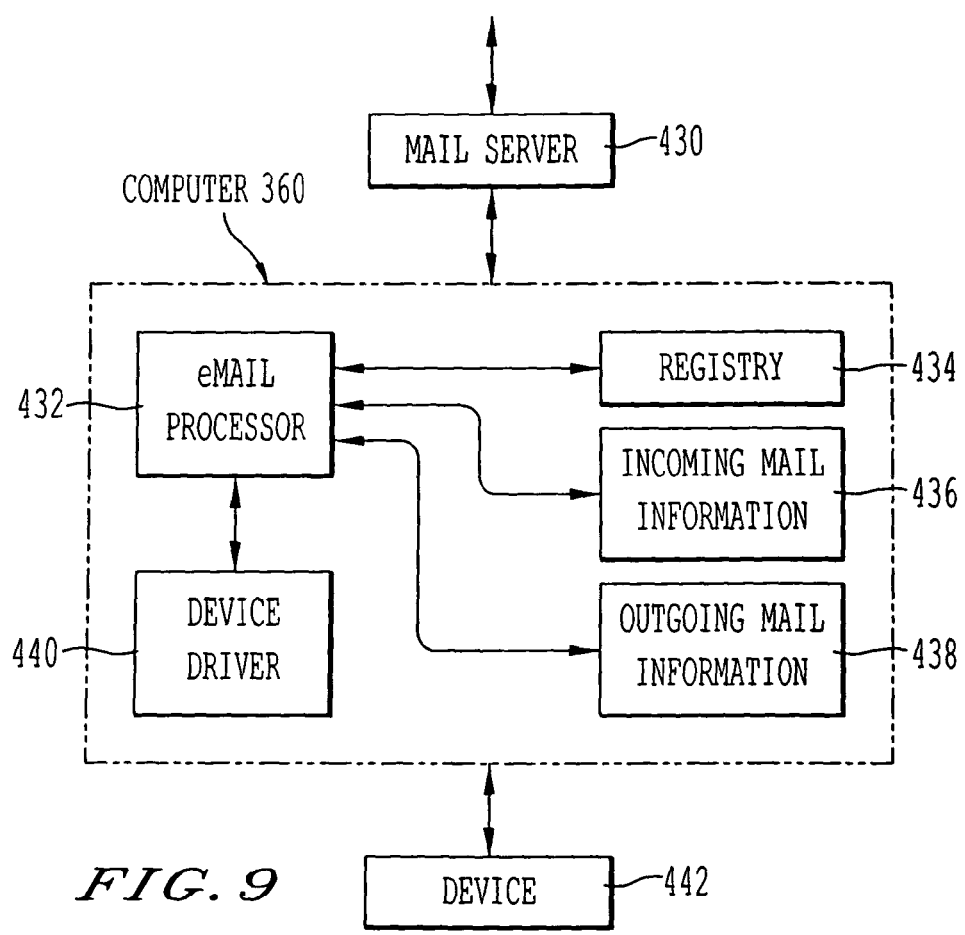
FIG. 9 illustrates in block diagram format modules, objects, and information which are contained within a computer.

FIG. 9 illustrates various objects such as software objects and modules contained within the computer 360. The computer 360 is connected to a mail server 430 through which mail is sent and received. The mail server 430 may be located at the Internet service provider 264 of FIG. 5, may be located on a network, may be owned by the company owning the computer 360, or may even be located inside of the computer 360, for example. An e-mail processor 432 is utilized to control the transmitting and receiving of electronic mail messages. The e-mail processor may be implemented in any desired or known manner and may be based on commercially available electronic mail programs such as Microsoft's Outlook Express, or GroupWise by Novell, although any other e-mail program may be used, if desired. As a specific implementation, the e-mail system may retrieve e-mail from the server using POP3 (Post Office Protocol) and to access the e-mail server in order to send e-mails using SMTP (Simple Mail Transfer Protocol), although any other protocol may be used, if desired. If the computer 360 utilizes an operating system such as an operating system from Unix, then the computer will usually have an IP address and a mail system built-in. Therefore, there may be no need to utilize the mail server 430 with such a system. A registry 434 contains various information of the system and may be implemented in the same or similar manner as the registry of Windows 95, Windows 98, and/or Windows NT, for example. Incoming mail information 436 may be utilized to store incoming mail. Additionally, if desired the incoming mail information 436 may be implemented to store the POP3 location, and store file information about the incoming e-mails. Outgoing mail information 438 contains information regarding SMTP and file information for outgoing mail. A device driver 440, such as a printer driver, scanner driver, or other driver, for example may be used to communicate with the device 442 which may be any type of device from which information is desired or to which information or control signals are to be sent. The device driver 440 is implemented to translate commands or signals from the e-mail processor 432 to signals which are transmitted to the device 442 and vice versa. Alternatively, the e-mail processor 432 may perform more of the processing functions and the device driver 440 may have more simple programming and few responsibilities. Further, any other implementation of the software may be utilized as long as the function of proper communication and control of the device 442 using e-mail messages is performed.

Figure 10:
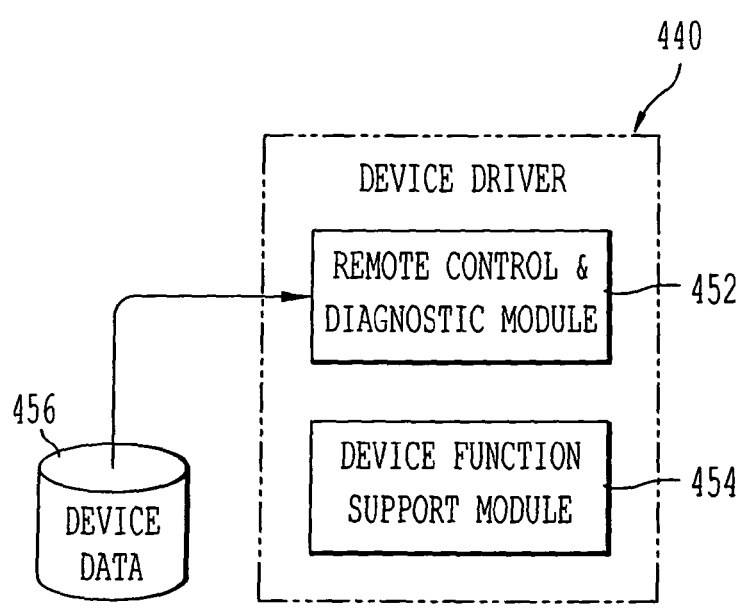
FIG. 10 illustrates information of a device driver which may be used with this invention.

A more detailed exemplary implementation of the device driver 440 of FIG. 9 is illustrated in FIG. 10. The device driver 440 includes a device function support module 454 which may be implemented to perform the conventional and/or desired functions of a device driver. The device driver 440 also includes a remote control and diagnostic module 452. If desired, the remote control and diagnostic module 452 may be implemented to perform some or all of the control and/or diagnostic functions which are described in the related patent and patent applications and are incorporated by reference above. By implementing the control and diagnostic module 452 in the device driver 440, the cost of the device 442 may be reduced and the resources and capabilities of the device 442 may be eliminated or reduced such as by reducing the amount of memory in the device 442 such as DRAM (Dynamic Random Access Memory) or flash memory, for example. This reduced cost is possible as the hardware resources of the computer 360 may be utilized in place of constructing additional hardware to go into the device 442, if desired. Various information including log information and error information may be stored in a data base which includes device data 456 using any desired hardware and data or data base management software. Further, software within the device 442 may be reduced by increasing the functions performed by the device driver 440 including functions performed by the remote control and diagnostic module 452 and the device function support module 454. These two software modules may be implemented in one software module, if desired. Additionally, the software which keeps track of the usage of the device may be removed from the device itself and included in the device driver 440.

Figure 11:
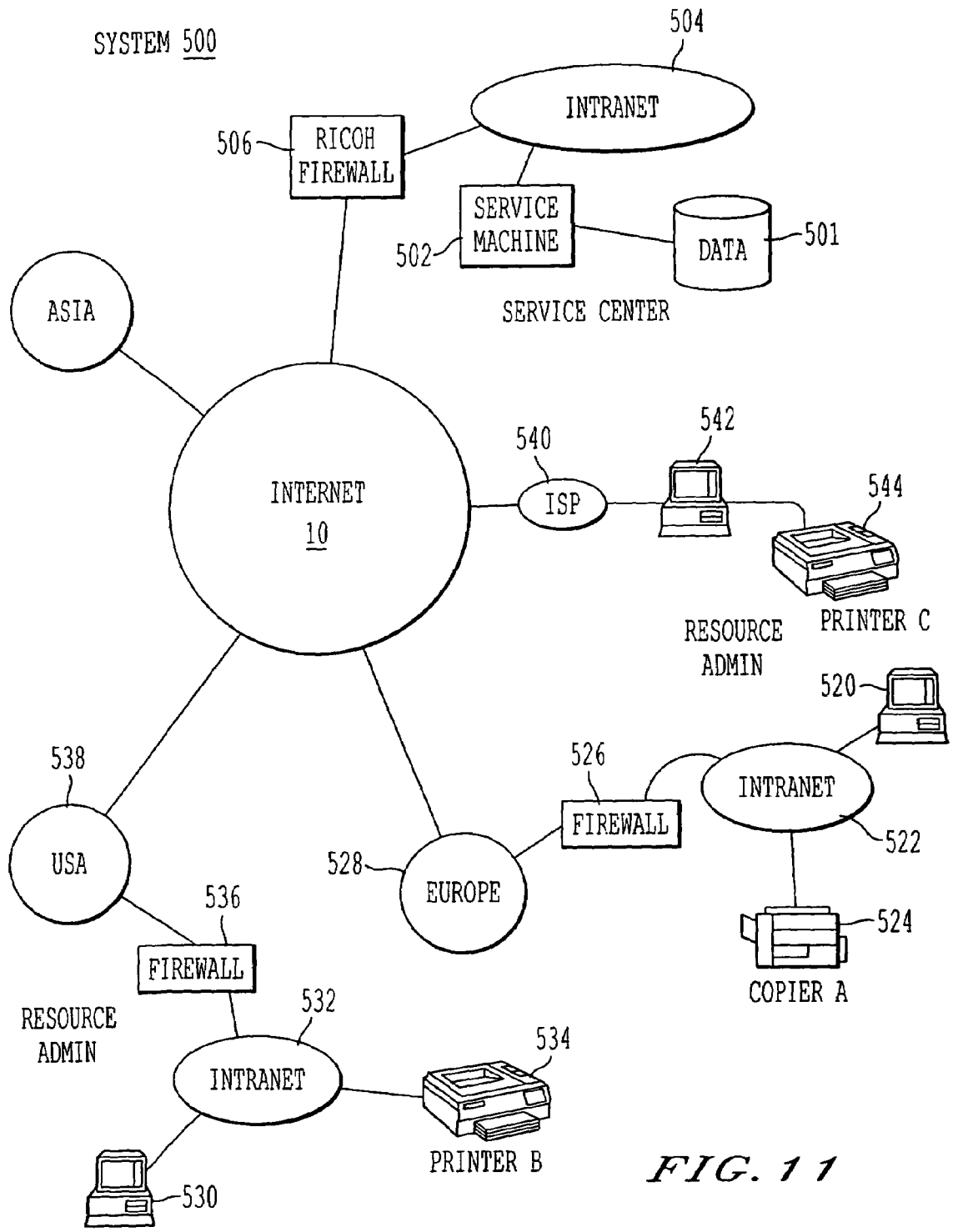
FIG. 11 illustrates a network with resource administration stations and a service center.

FIG. 11 illustrates an exemplary network with resource administration stations and a service center. The Internet 10 provides connectivity to a plurality of Intranets 504, 522, and 532, each having firewalls 506, 526, and 536, respectively, for a System 500. As illustrated, the Intranet 504 is an exemplary Ricoh Intranet including the Ricoh Firewall 506, a Service Center 502 having access to data 501 in a database connected to a Service Machine at the Service Center 502. As illustrated, the exemplary Intranet 522 is resident in Europe 528. The Intranet 522 includes a Resource Administrator 520 and Copier A 524. The exemplary Intranet 532 resides in the USA 538 and includes a Resource Administrator 530 and a Printer B 534. Also, as illustrated in FIG. 11, an Internet Service Provider ("ISP") 540 is connected to a computer 542 which is connected to a Printer C 544.

Figure 12:
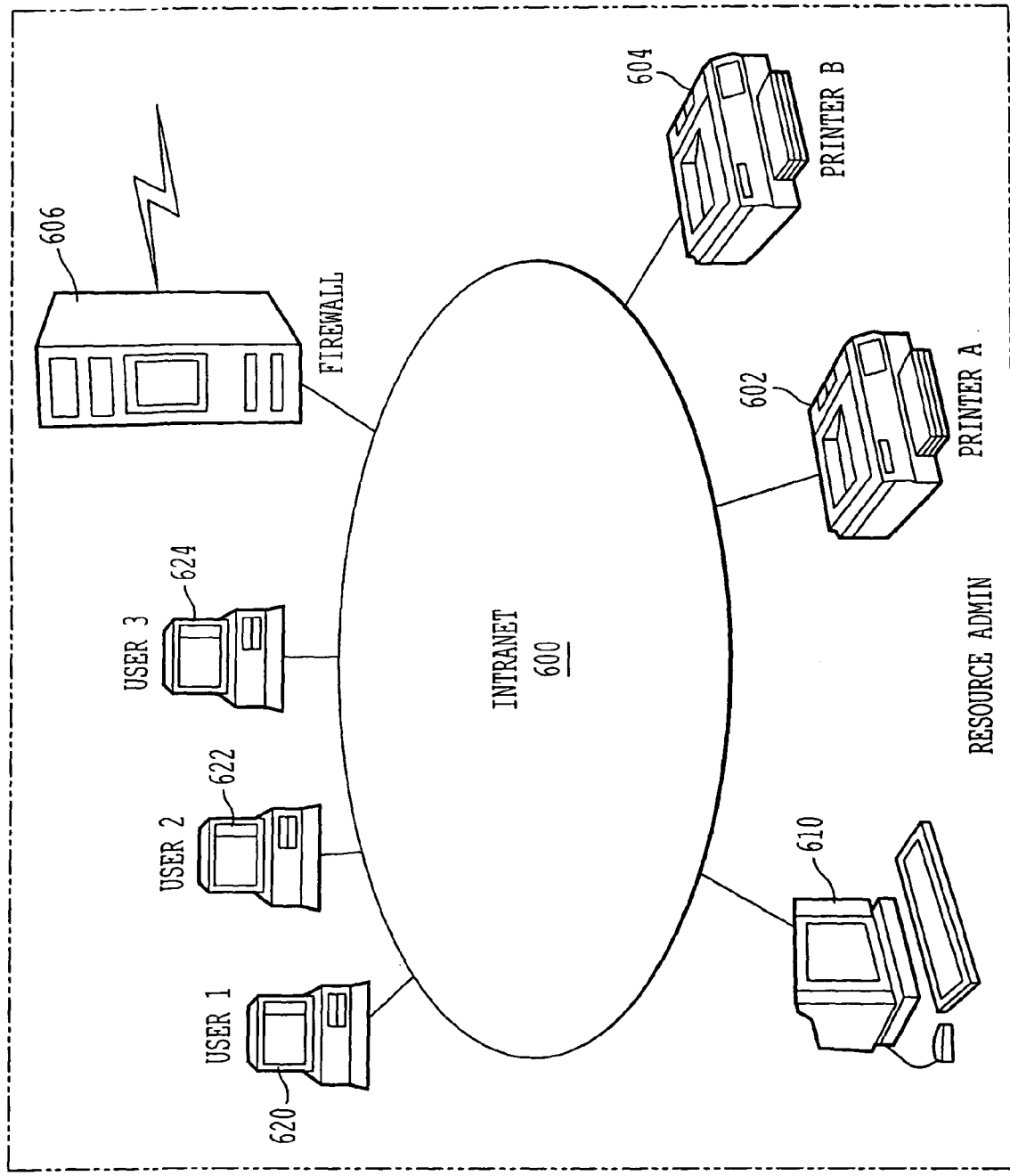
FIG. 12 illustrates an intranet with a resource administrator, end user stations, and devices connected to the intranet.

FIG. 12 illustrates an exemplary Intranet 600, having a Firewall 606, three end users 620, 622, and 624, a Resource Administrator 610, and two devices, Printer A 602 and Printer B 604. The Resource Administration station of the Resource Administrator 610 may be the station of system administration. The Resource Administration station monitors network resource usage such as use of the network printers Printer A 602 and Printer B 604 of FIG. 12. The resource usage within the Intranet 600, such as, for example, use of Printer A 602 and Printer B 604 in FIG. 12 is monitored by the Service Center 502 of FIG. 11 and summary information is transferred to the Resource Administration station at predetermined times, or upon the occurrence of predetermined events. Summary information transmission may be predetermined by, for example, a contract between a company controlling the service center and a customer, or end user. The summary information transmission may be, for example, monthly, weekly, or on specified dates such as the first of the month or the last day of the month, or on Monday or on Friday. The report sent to the user may be customized by providing predetermined requested information and/or a predetermined format, such as, for example, Excel format or HTML format for ease of viewing.

Since Printer A 602 and Printer B 604 are connected to a network, they have Internet Protocol ("IP") addresses. The printers 602 and 604 can send status messages to either the Resource Administration station 610 or to the Service Center 502 of FIG. 11 through the Firewall 606 of FIG. 12. As previously shown, a message can be sent directly to the Resource Administration station 610 if urgent service is needed. Urgent service may include, for example, a copy machine needing toner, a printer running out of paper, a paper jam, a lack of electrical power, or any other device problem which requires immediate attention, either manually or electronically. Non-urgent messages may include, for example, usage reports such as the number of pages or jobs printed by a printer, the number of calls received by a facsimile machine, data concerning facsimile transmissions made by a particular end user or users of an intranet, the number of copies made by a particular end user, the amount of time an end user has spent utilizing a particular network device, and facsimile information for facsimile transmissions made by a particular end user or an office.

Exemplary details of transmission of urgent and non-urgent transmission are disclosed, for example, in U.S. Pat. No. 5,819,110, and as discussed below. Means other than electronic mail may be used for the purpose of calling attention for urgent service. For routine information, however, the Service Center 502 may manage all resources on the Intranet 600 and may send predetermined selected information to the Resource Administration station 610 using electronic mail. Although the information may be available, for example, on the World Wide Web, busy end users tend to forget to check web sites. Thus, electronic mail is well suited for obtaining the attention of a proper recipient of the message.

It is to be noted that messages transmitted to the Service Center 502 are generated by the network devices. The Service Center 502 may be the central servicing center of a large corporation, for example, while a resource administrator may be an entity responsible for managing local resources for an intranet for an office site. It is also to be noted that network devices may include household appliances and meters. In such cases, the Resource Administrator may, for example, be a home computer user.

Figure 13:
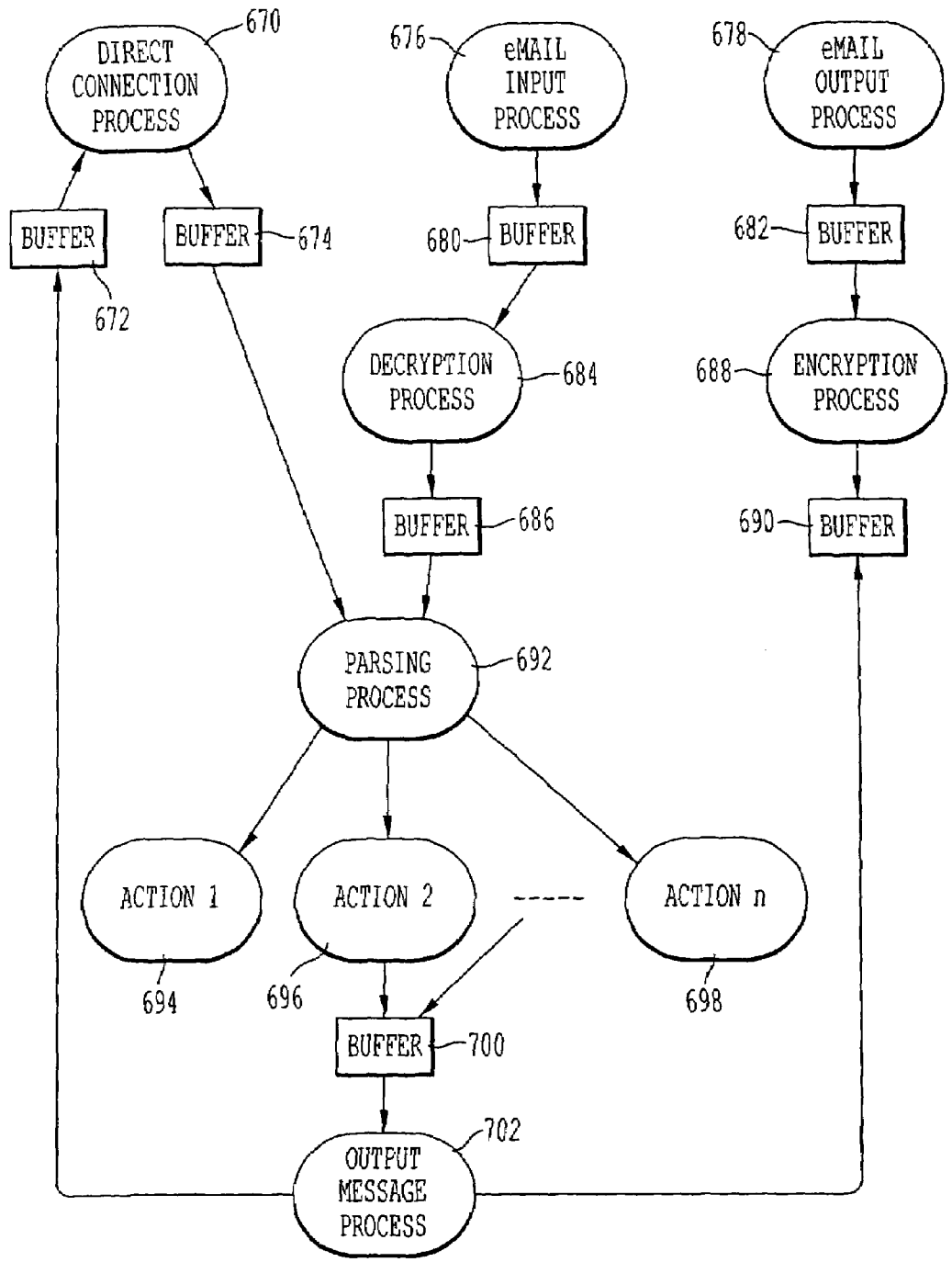
FIG. 13 is a data flow diagram of communications to and from the device.

FIG. 13 illustrates a data flow diagram which processes incoming messages to and outgoing messages from a machine such as the digital copier/printer. A direct connection process 670 is used to process incoming and outgoing communications in a connection-mode of communication such as through a local area network, telephone line, or ISDN line. Incoming messages pass through buffer 674 to a parsing process 692 which performs parsing of incoming information in a known and conventional manner. The incoming information causes various actions such as the actions illustrated in 694, 696, 698 to occur. Some actions require that a message be returned and the returned message is illustrated by the arrows leading to buffer 700. An output message process is performed which prepares an outgoing message to either the direct connection or e-mail process. The direct connection process passes through buffer 672 before passing through the direct connection process 670.

For an e-mail-mode of communication, there is an e-mail input processor 676 and an e-mail output processor 678. Incoming e-mail-mode communications pass through buffer 680 and a decryption process is performed in step 684. The decrypted information is stored in buffer 686 and passed to a conventional parsing process 692. As explained above, one or more of the actions 694, 696 and 698 are performed and outgoing messages pass through the buffer 700 to the output message process 702. Then, the e-mail-mode outgoing messages pass through a buffer 690, after which they are encrypted by the encryption process 688. The encrypted messages then pass through buffer 682 and are transmitted via the e-mail output process 678 over a network such as the Internet to their final destination.

Any type of e-mail-mode of communication may be used by the present invention. An inexpensive and readily available medium through which e-mail messages may pass is the Internet processing electronic mail messages. The e-mail input and output processes may be according to any known Internet e-mail protocol such as used by the BSD Unix mail system which is incorporated into the SunOS 4.1.X. Also, other information describing Internet e-mail operations are readily available through various sources on the Internet itself. It is well known that Internet e-mail requires an identifier or address of the machine which is to receive the e-mail. Further, Internet e-mail protocols typically construct an electronic mail message to include an envelope, a header and a body. The envelope typically includes the identifier or address of the machine or person which is to receive the e-mail and the identifier or address of the originator of the message or where replies to the message are to be sent. The header typically includes a description of the encoding type or version of the e-mail message. The identifier or address of Internet e-mail addresses typically include a name which identifies the recipient or user of an e-mail server, followed by the "@" symbol, followed by the domain name or host name of the mail server. These various features of e-mail are utilized by the BSD Unix mail system of the SunOS 4.1.X. While the Internet provides an inexpensive manner of an e-mail-mode of communication, the Internet electronic mail system may be slow or unreliable and therefore, in certain circumstances, instead of using an e-mail process, a direct connection process as described above, is performed.

Figure 14:
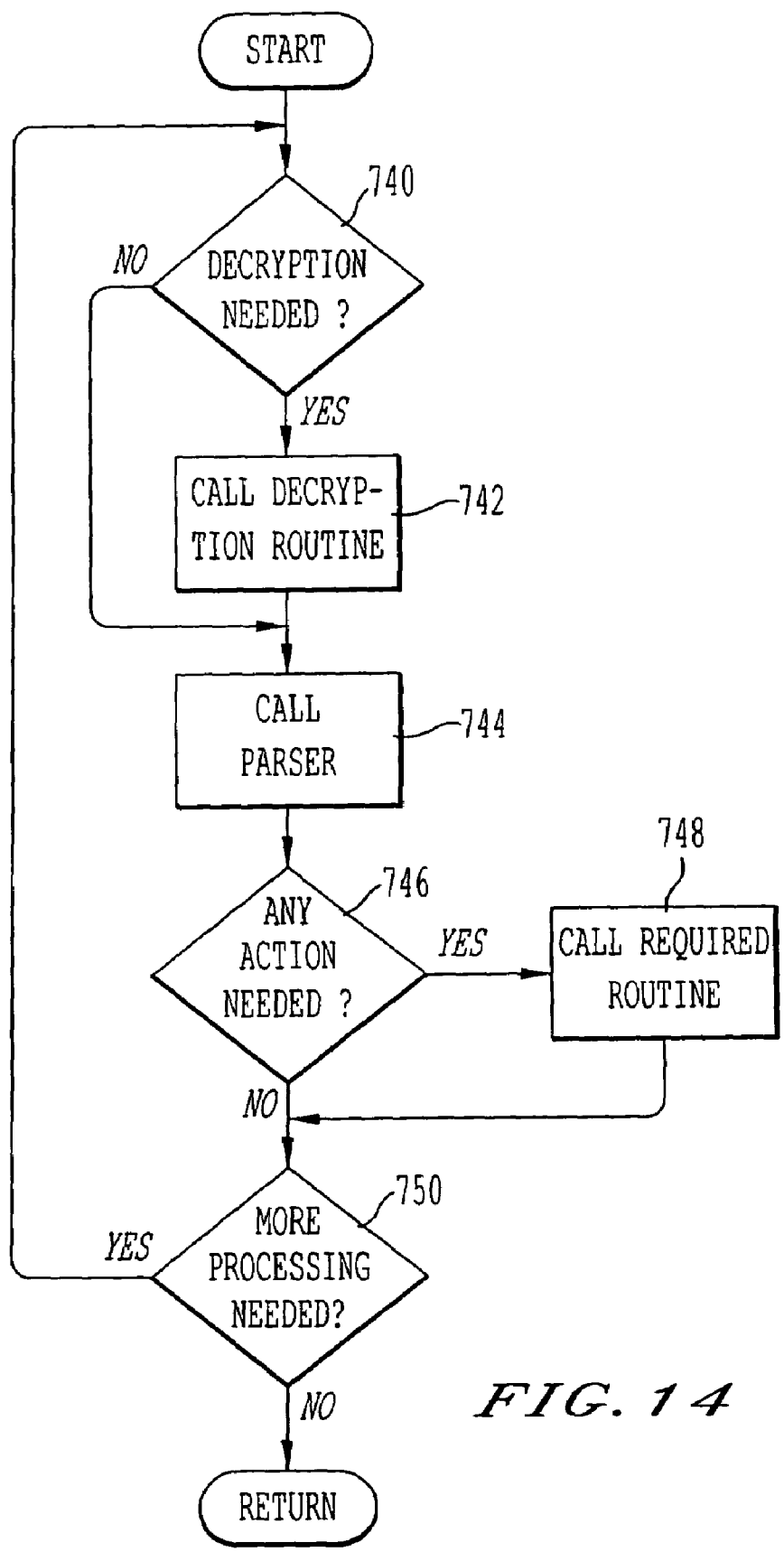
FIG. 14 is a flowchart illustrating the process of the data flow diagram of FIG. 13.

FIG. 14 illustrates a flowchart which may be used to implement the data flow diagram illustrated in FIG. 13. After starting, step 740 determines if decryption is needed and if it is, a decryption routine is performed in step 742. Step 744 then calls a parser which parses in a conventional manner and step 746 determines if any action needs to be taken. If it does, for example, when information is to be transmitted back to the remote monitoring, diagnosis, or control device, step 748 calls the required routine. Step 750 determines if more processing is needed and flow returns back to step 740 for further processing. Otherwise, flow returns to the calling process.

Figure 15:
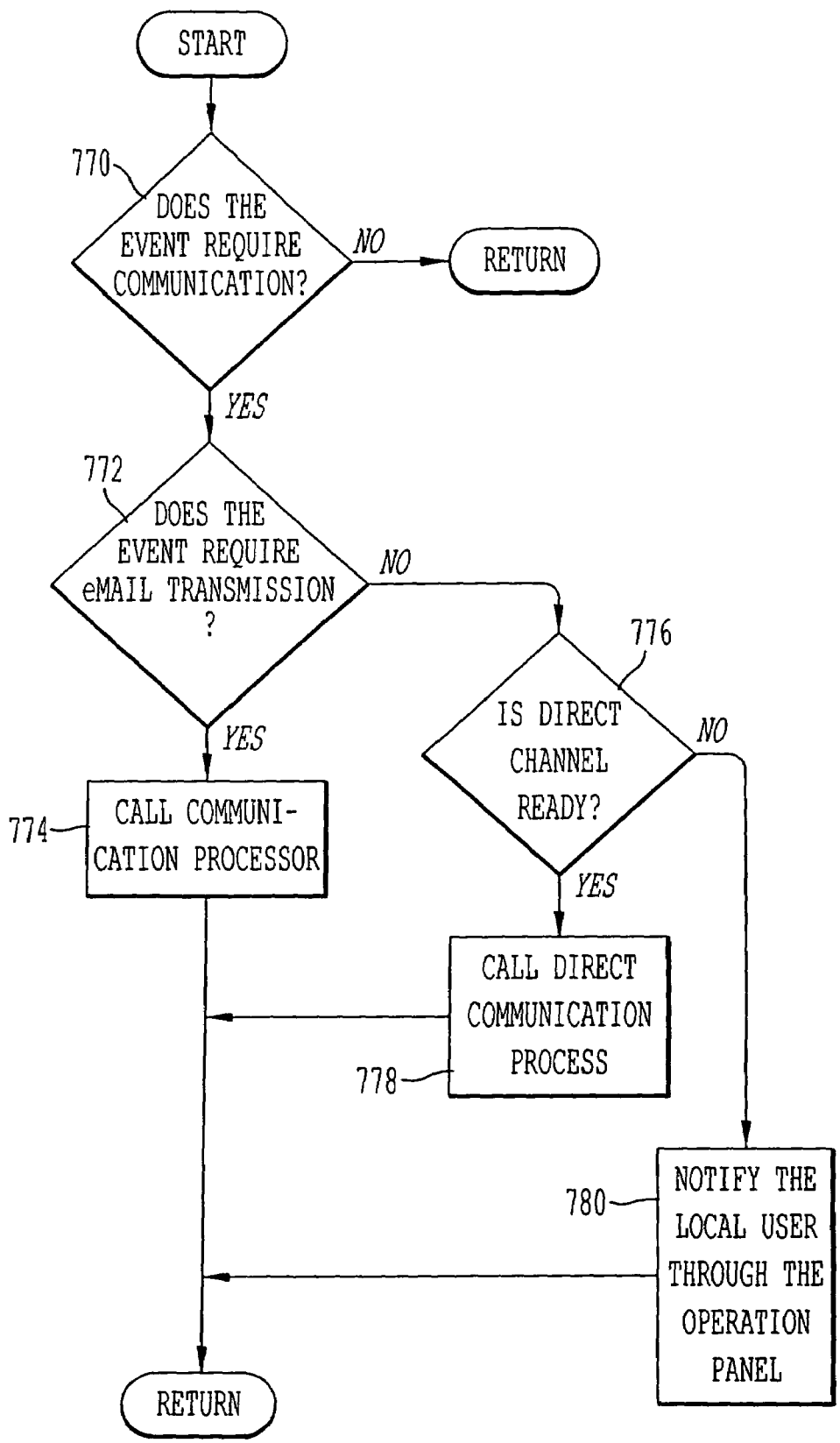
FIG. 15 is a flowchart illustrating the processing performed when communication is initiated by the device.

FIG. 15 illustrates a process performed within the machine which determines whether a connection-mode or an e-mail-mode of communication is needed. After starting, step 770 determines if an event requires communication and if it does not, flow returns to the calling process. If communication is needed, step 772 determines whether the event requires an e-mail-mode or a connection-mode of transmission. Any type of high priority event for which immediate attention is needed or which the remote monitoring device would be interested in on an expedited basis is sent in a connection-mode of communication. This may be used when a hazardous connection exists within the machine or when something in the machine needs immediate attention. For example, if a thermistor in the fuser unit senses a high and unsafe temperature, a direct connection mode may be used. However, the transmission of a weekly or monthly report indicating the usage and a normal condition state in the machine can use the slower e-mail-mode of communication. Additionally, when the e-mail-mode of communication is not properly functioning, the connection-mode of communication is used. For example, if an Internet e-mail message is not properly received by the monitoring device, a direct connection-mode of communication is used. The e-mail message may contain a request for acknowledgment of receipt and if an acknowledgment is not received within a predetermined time (e.g. 3-24 hours) then a connection-mode communication is used to re-transmit the message. Also, if a connection-mode of communication is not properly functioning, then the e-mail-mode of communication may be used.

If step 772 determines that an event does not require an e-mail-mode of communication, step 776 determines if the direct communication channel is ready. For example, it determines if network, the telephone or ISDN line is available. If it is, a direct communication process is performed in step 778 to transmit the appropriate information. If the direct channel is not ready, step 780 notifies the user through the operation panel that there is a problem with the device. If step 772 determines that the event requires an e-mail-mode of transmission, step 774 calls an e-mail communication process. The process of FIG. 15 then returns to the calling process.

Figure 16:
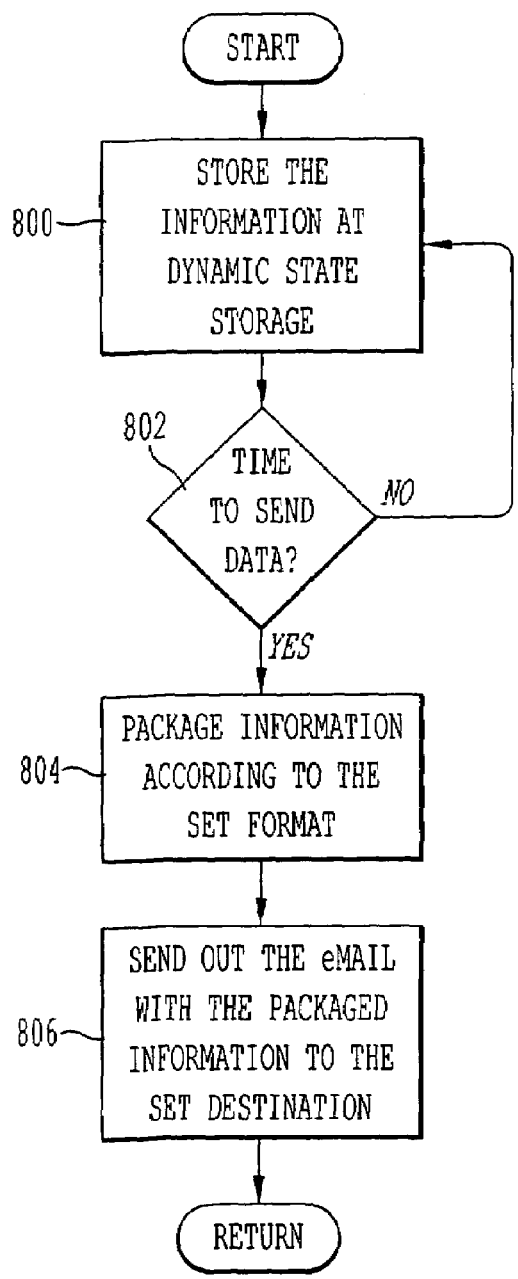
FIG. 16 is a flowchart illustrating the processing performed when a non-urgent message is sent from the device.

FIG. 16 is a flowchart illustrating the processing performed when a non-urgent message is sent from a device. After starting, step 800 stores the information which needs to be transmitted in dynamic state storage. Step 802 determines whether it is time to send the data. When step 802 determines that it is not time to send the data, control passes to step 800, which was discussed previously. When step 802 determines that it is time to send data, step 804 packages the information according to the set format, and step 806 sends out the e-mail with the packaged information to its predetermined destination. The process of FIG. 16 then returns to the calling process.

Figure 17:
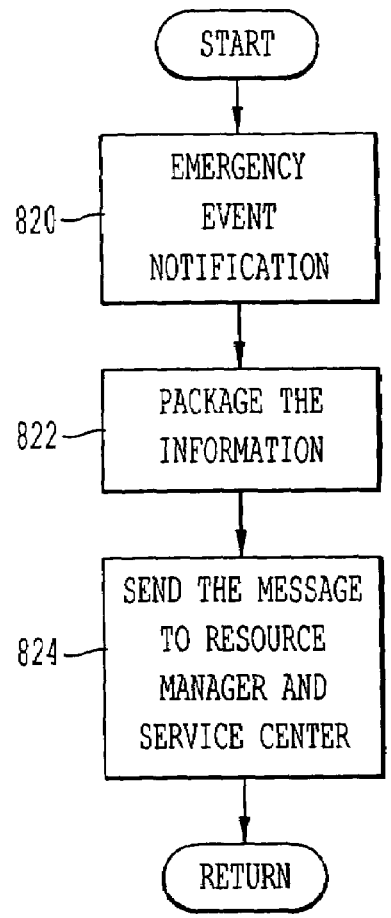
FIG. 17 is a flowchart illustrating the processing performed when an urgent message is sent from the device.

FIG. 17 is a flowchart illustrating the processing performed when an urgent message is sent from the device. After starting, step 820 issues an emergency event notification 820. Examples of such emergency events may include, for example, a paper jam, an electrical outage, an overheating mechanism on a device, a lack of paper, or a lack of toner. Step 822 packages the information for transmission. Step 824 then sends the message to the Resource Manager and Service Center, for example, the Resource Administrator 520 or 530 or the Service Center 502 of FIG. 11. The process of FIG. 17 then returns to the calling process.

Figure 18:
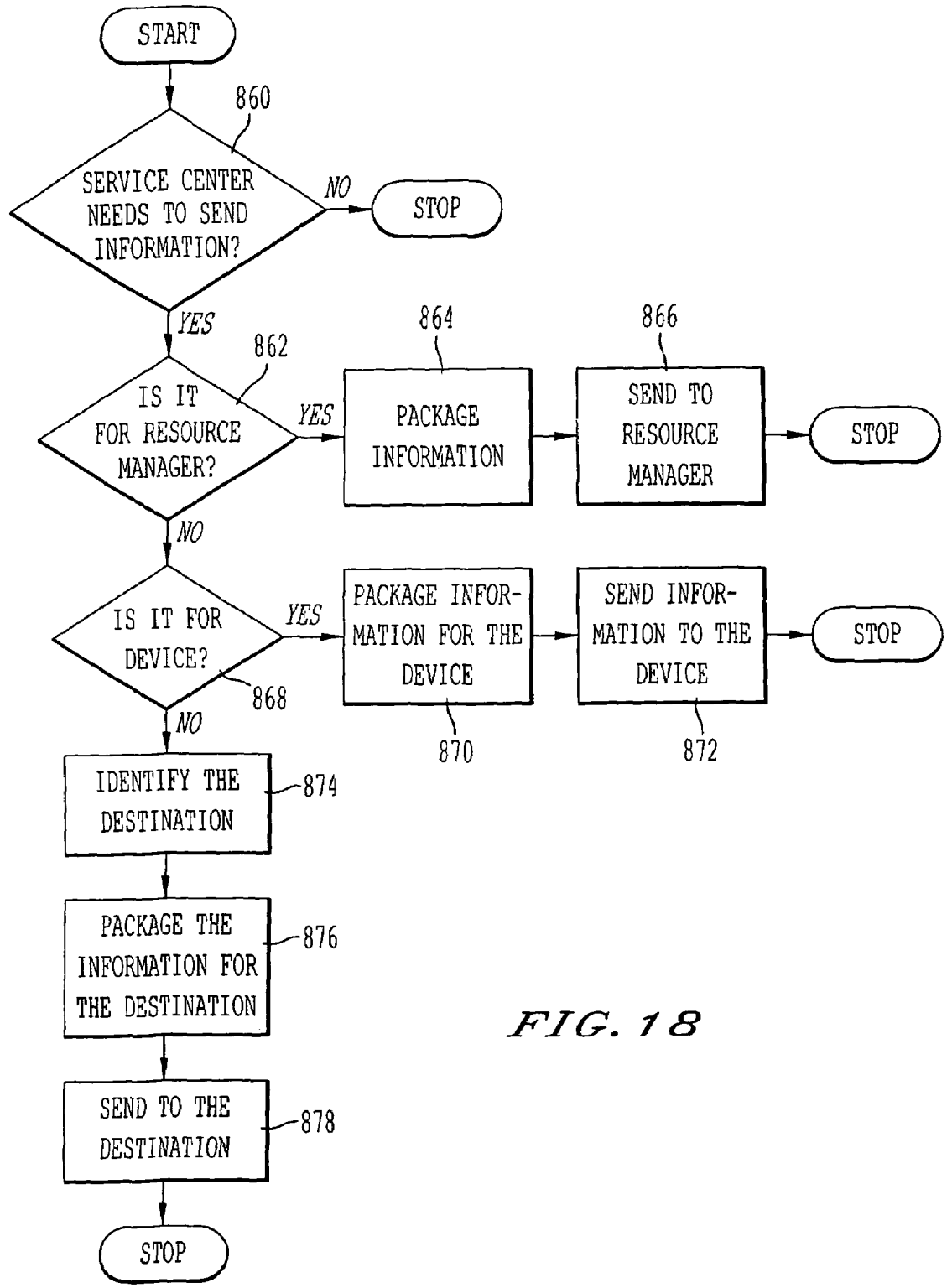
FIG. 18 is a flowchart illustrating the processing performed when a message is sent from the service center.

FIG. 18 is a flowchart illustrating the processing performed when a message is sent from the service center, for example, from the Service Center 502 of FIG. 11. After starting, step 860 determines whether the service center needs to send information. If step 860 determines that the service center does not need to send information, then the process of FIG. 18 returns to the calling process. If step 860 determines that the service center needs to send information, step 862 determines whether the information is to be sent to the Resource Manager, for example one of the resource administrators 520 or 530 of FIG. 11. When step 862 determines that the information is for the resource manager, step 864 packages the information, step 866 sends the packaged information to the resource manager, and the process of FIG. 18 returns to the calling process.

When step 862 determines that the information is not for the resource manager, step 868 determines whether the information is to be sent to the device. When step 868 determines that the information is for the device, step 870 packages the information for the device, step 872 sends the packaged information to the device, and the process of FIG. 18 returns to the calling process. When step 868 determines that the information is not for the device, step 874 identifies the destination for the information to be sent. Step 876 then packages the information for the destination which is identified. Step 878 sends the information to the destination, and the process of FIG. 18 returns to the calling process.

FIG. 19A illustrates an exemplary e-mail message utilized by the invention. In FIG. 19A, lines 1-7 are part of the e-mail header. Each header field contains a name, followed by a colon, followed by the field value. RFC (Request For Comments) 822 specifies the format and interpretation of the header fields, which is incorporated by reference. The fields of the header illustrated in FIG. 19A are fairly standard and self-explanatory. Line 1 indicates from where the e-mail originated, line 2 indicates the date the e-mail was sent, line 3 indicates a name associated with the e-mail address (Service Center), line 4 indicates to whom the e-mail is addressed and line 5 indicates the subject of the e-mail message. Line 6 indicates the MIME version utilized by attachment encodings. MIME is utilized to send binary files in electronic mail messages which permit only ASCII characters. MIME allows the binary encoding to be converted to these ASCII characters which are subsequently converted back to the original binary files at the appropriate time. Such a use of MIME encoding is well known. Line 7 designates one or more content fields such as the type of text, the length of the message and any other desired information.

Additionally, e-mail messages also contain what is referred to as an envelope which is used by the message transfer agents for delivery. The envelope may be specified by SMTP commands such as "mail from" and "RCPT 2". Further information about the envelope is specified in RFC 821, which is incorporated herein by reference. A third part of an e-mail message is the message body which is the content of the message. RFC 822 specifies the body as lines of ASCII text. In FIG. 19A, the body is set forth in lines 9-18.

There may be files attached to electronic mail messages, for example as illustrated in FIG. 19B. The attached file 900 in FIG. 19B is an executable file which allows a user to execute the programming code contained within the file. The attachment of files including executable files to electronic mail messages is a known feature of e-mail messages.

FIG. 20 illustrates a typical screen display of a computer executing an electronic mail program and displaying the e-mail message of FIG. 19A. When the FIG. 19A is displayed, the various encoding information is not shown to the user but is displayed in an appropriate format. At the bottom of the display 910 is a section relating to attachments. The message displayed in FIG. 20 shows an executable file "SUMMARY.EXE" as an attached file. As explained in the body or message of the e-mail, by executing the attached file, the attached file will cause certain testing, gathering of information, controlling, or logging of information of the attached printer. Typically, the attached file is executed by "clicking" or "double-clicking" on the attachment. Alternatively, the attachment may be saved as a separate file and then executed using the appropriate commands available within the operating system. Further, any other desired method may be used to execute the file.

Figure 21:
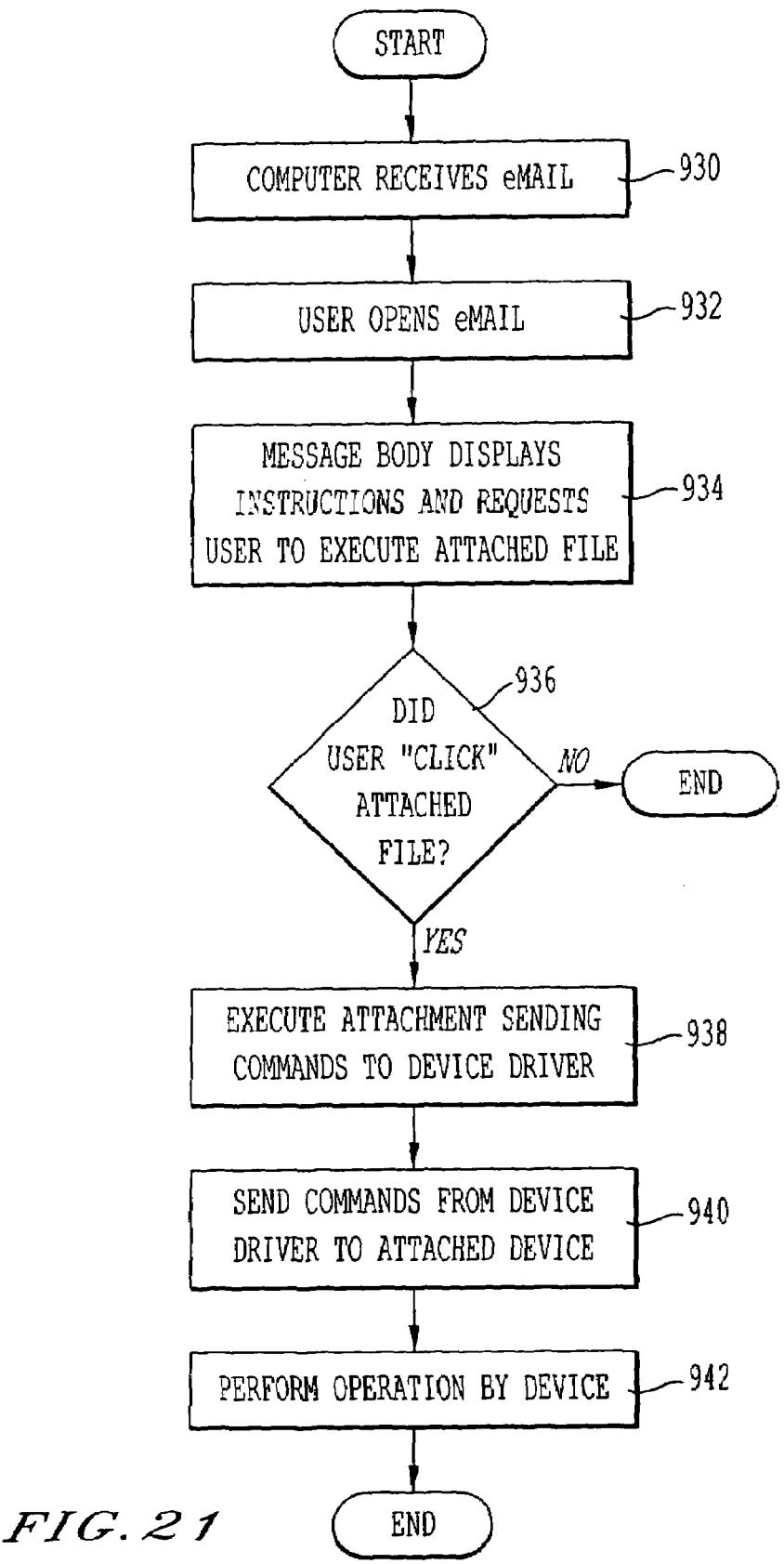
FIG. 21 illustrates a method of receiving an e-mail message.

FIG. 21 illustrates a process of receiving an e-mail message which is ultimately used to transmit information such as data, control commands, or diagnostic commands to an attached device according to an embodiment shown in FIGS. 19A, 19B and 20. This method may be performed with any desired type of computerized or other type of hardware and/or software and may be performed using the hardware and software organization, as described above. In the embodiment of FIG. 21, the e-mail message is received in any conventional or desired manner and it is a manual action by the user which causes the e-mail message to perform the desired operation. In FIG. 21, after starting, in step 930, the computer receives an incoming e-mail message. In step 932, the user opens the e-mail message in accordance with the requirements of the e-mail program which is executing on the user's computer and in step 934, the message body of the e-mail messages displays instructions and requests the user to execute the attached file. Step 934 corresponds to the display of FIG. 20. FIG. 20 shows that the message displays to the user the origin of the e-mail message, the purpose of the e-mail message, and how the user should execute the attached file in order to perform the desired operations. Alternatively, any desired message may be displayed to the user. The operations which are performed are determined by the attached file SUMMARY.EXE.

Step 936 determines if the user "clicked" the attached file which causes the attached file to be executed. Alternative manners of executing the attached file may be performed such as double clicking the attached file, saving the attached file and using a command of the operating system to cause the file to execute, or the attached file may be executed in any other way. After the user causes the execution of the attached file to begin, flow proceeds to step 938 which executes the attached file. In the preferred form of the invention, the attached file causes commands to be transmitted to the device driver. In step 940, the device driver receives the commands from the executing attachment and sends the appropriate commands and information to the attached device. In step 942, the operation specified by the attached file is performed by the device. Such an operation may be any type of operation including any of the operation, control functions, or data requests or manipulations described in any of the related patents and patent applications specified above. Exemplary operations performed by the device including remote control and diagnostic operations, the transmitting of information pertaining to the operation or failures which have occurred within the device, and also operating parameters utilized by or stored in the device.

While the process of FIG. 21 has been explained with respect to the use of a device driver, the device driver is a convenient label for the routine which allows control of the attached device, and any other type of software which controls the attached device may be utilized in place of the device driver. For example, the e-mail program itself may be able to send commands and/or data directly to the attached device. The attached device may be any of the devices which have been explained above.

One manner of causing the execution of the program code is to use a graphical pointing device such as a mouse connected to the computer, having the user place a pointer on the object representing the file (e.g., the attached file summary.exe), and subsequently having the user press a button while the user points to the file.

Figure 22:
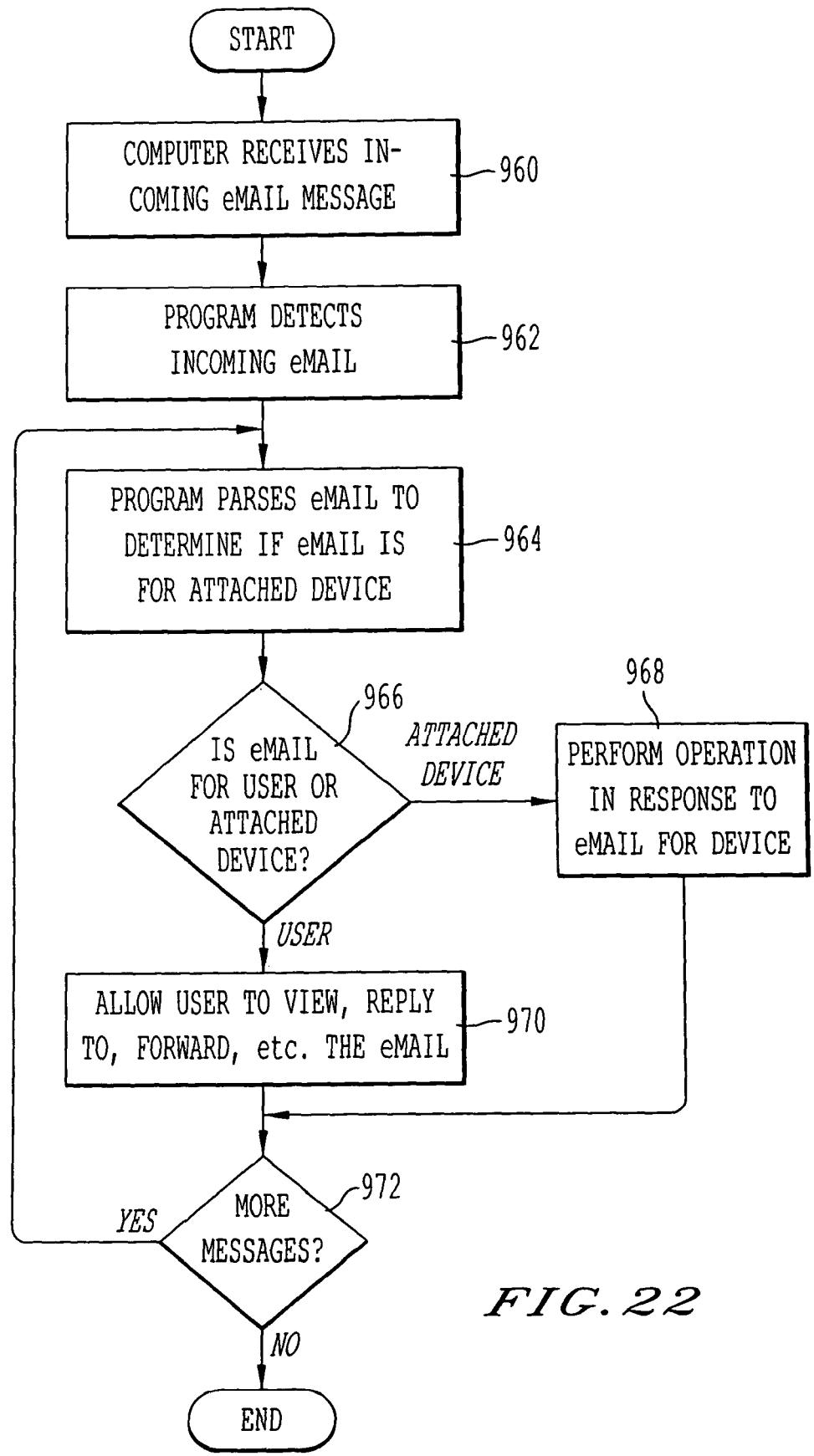
FIG. 22 illustrates a second method of receiving an e-mail message.

FIG. 22 illustrates an alternative embodiment of receiving e-mail messages in which the computer or program executing therein automatically detects that the incoming e-mail message is used for communication with the attached device. Thus, in this embodiment, there may be no need for the user to execute an attached file. In FIG. 22, after starting, step 960 receives an incoming e-mail message. In step 962, a program, such as an electronic mail processing program, detects that there is an incoming e-mail message. The detection of incoming e-mail may be performed in any desired manner. Currently, commercially available e-mail programs have the capability to automatically detect incoming e-mail messages and such conventional automatic detecting capabilities may be utilized. Further, in Unix, a specific directory labeled "/var/mail" which contains a file with a user name receives files corresponding to incoming e-mail messages and when this file changes in size, appears, or more files appear, the system can detect that there is an incoming e-mail message. In step 964, the executing program parses the e-mail to determine if the e-mail is for the attached device. Such parsing is performed by determining if a predetermined code exists at a predetermined place in the e-mail message. Exemplary positions of such a code may be in the subject line of the e-mail message, may be a special code which appears within the message body, may be a code which appears in the message header, including a user defined field within the header, or may even be in the message envelope. It may also be possible for the incoming e-mail message to have an address which is routed to the computer which is attached to the device and such messages are not displayed to the user but are directly used for processing. For example, the device may have its own account. Then, the "var/mail" directory discussed above includes a file with the account name of the device. Step 966 performs an analysis of the parsed e-mail to determine if the e-mail is for the user or for the attached device. When the e-mail is determined to be for the attached device, flow proceeds to step 968 which performs an operation in response to the e-mail for the device. This performed operation may be any of the previously described operations including operations described in the related patents and patent applications including the performing of a mechanical action, such as movement of a scanning head or printer head or causing any other type of mechanical actions typically performed by the device in question, and also operations including the transmitting of parameters.

When step 966 determines that the attached e-mail is for a user (e.g., the e-mail is unassociated with the attached device and is not used to control or monitor the attached device), flow proceeds from step 966 to step 970 which allows the user to view, reply to, forward, or perform any other desired function on this e-mail. From steps 970 and 968, control flows to step 972 which determines if there are additional e-mail messages. If there are more messages, flow proceeds back to step 964. If there are no more messages, the process of FIG. 22 ends.

Another alternative to using e-mail is to send, to a user of the computer, an e-mail message with a web address where an executable file may be downloaded. Unlike attaching executable code, this method will at least allow the user to verify the web site before downloading and executing code. This method requires more work by the user, but allows the user to check the source of the executable code.

In addition to receiving electronic mail messages which are used for monitoring and/or controlling an attached device, the invention also includes the transmission of e-mail messages which contain information of the device attached to the computer. The present invention prepares data for transmission in e-mail messages, such as the information which is illustrated in FIGS. 25-28 which are explained below.

Figure 23:
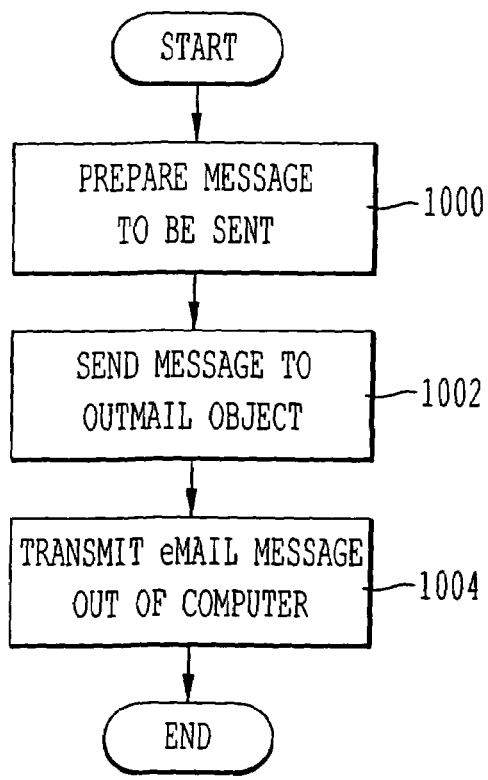
FIG. 23 illustrates a method of transmitting an e-mail message.

FIG. 23 illustrates a first embodiment of transmitting an e-mail message. After starting, the message is prepared to be transmitted in step 1000. In order to prepare the message to be sent, data which is part of the message is obtained or generated. This data may be obtained by querying the device attached to the computer, or alternatively, is already stored in the computer. The data may also be obtained as disclosed in the related applications, if desired. The e-mail message is prepared to have a format of conventional e-mail systems including the envelope, header, and body of the e-mail message, as explained above, although any desired format may be used.

Step 1002 then sends the message to an outmail object. An outmail object is preferably a software object or routine executing within the computer which performs the transmission out of the computer. The manner in which the transmission is performed in the Microsoft Windows environment is through the use of the Messaging Application Programming Interface ("MAPI"). The MAPI allows interaction with the messaging system and does not require a programmer to write all code which is utilized to transmit messages. By setting the MAPI in Windows to a specific program, such as the Microsoft Outlook Express e-mail program, when a message is transmitted to the outmail object (the MAPI client), the message transmission may become automated. Details regarding the implementation and use of MAPI are set forth in the book "Inside MAPI" by Irving De la Cruz and Les Thalaer, published by the Microsoft Press, 1996, which is incorporated herein by reference. Any feature regarding the use of MAPI disclosed in this book may be utilized to implement the present invention using the MAPI client. In step 1004, the e-mail message is transmitted out of the client, preferably using the outmail object.

The outmail object has been described as being the Windows MAPI. However, any other outmail object may be used to assist in the transmission of e-mail messages. Alternatively, a software object does not have to be used but any desired code which assists in the transmission of the outmail object may be utilized.

Figure 24:
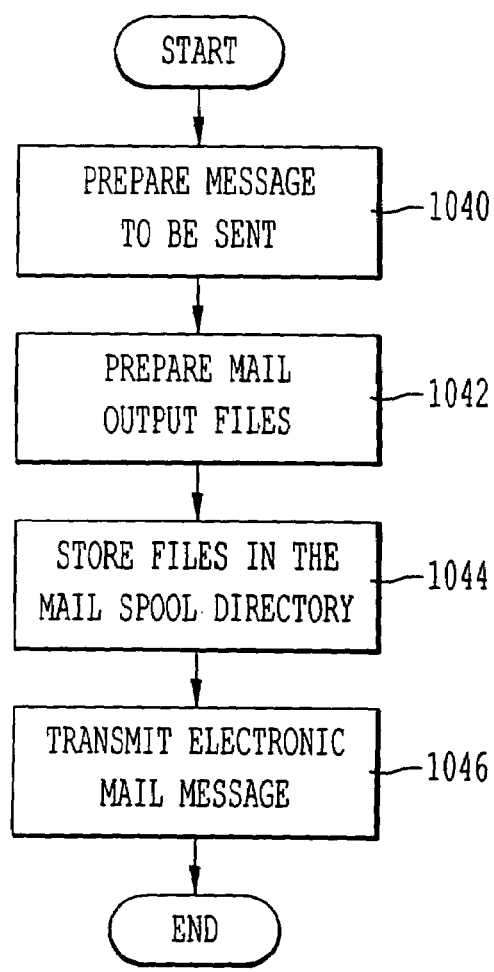
FIG. 24 illustrates another method of transmitting an e-mail message.

An alternative manner of transmitting e-mail messages according to the present invention is illustrated in FIG. 24. The method of FIG. 24 is preferably performed in a Unix environment, although any other software or operating system environment may be utilized as long as the desired steps are performed. In FIG. 24, after starting, step 1040 prepares the message to be sent. This step is utilized to obtain the information which is to be transmitted and may be performed in a similar manner as when step 1000 of FIG. 23 is performed, if desired. In step 1042 of FIG. 24, the mail output files are prepared and include the message which was prepared in step 1040. In step 1044, the output files which may be one or more files, the number of files being the number appropriate to the operating system, are stored in an outgoing mail directory which in Unix is referred as the mail spool directory. This directory in Unix may be located at /var/spool/mqueue, although any other appropriate directory may be used. Once the appropriate file(s) is (are) stored in the desired location, step 1046 is performed which transmits an electronic mail message corresponding to the file(s) which has been stored. The process of FIG. 24 then ends.

Figure 25:
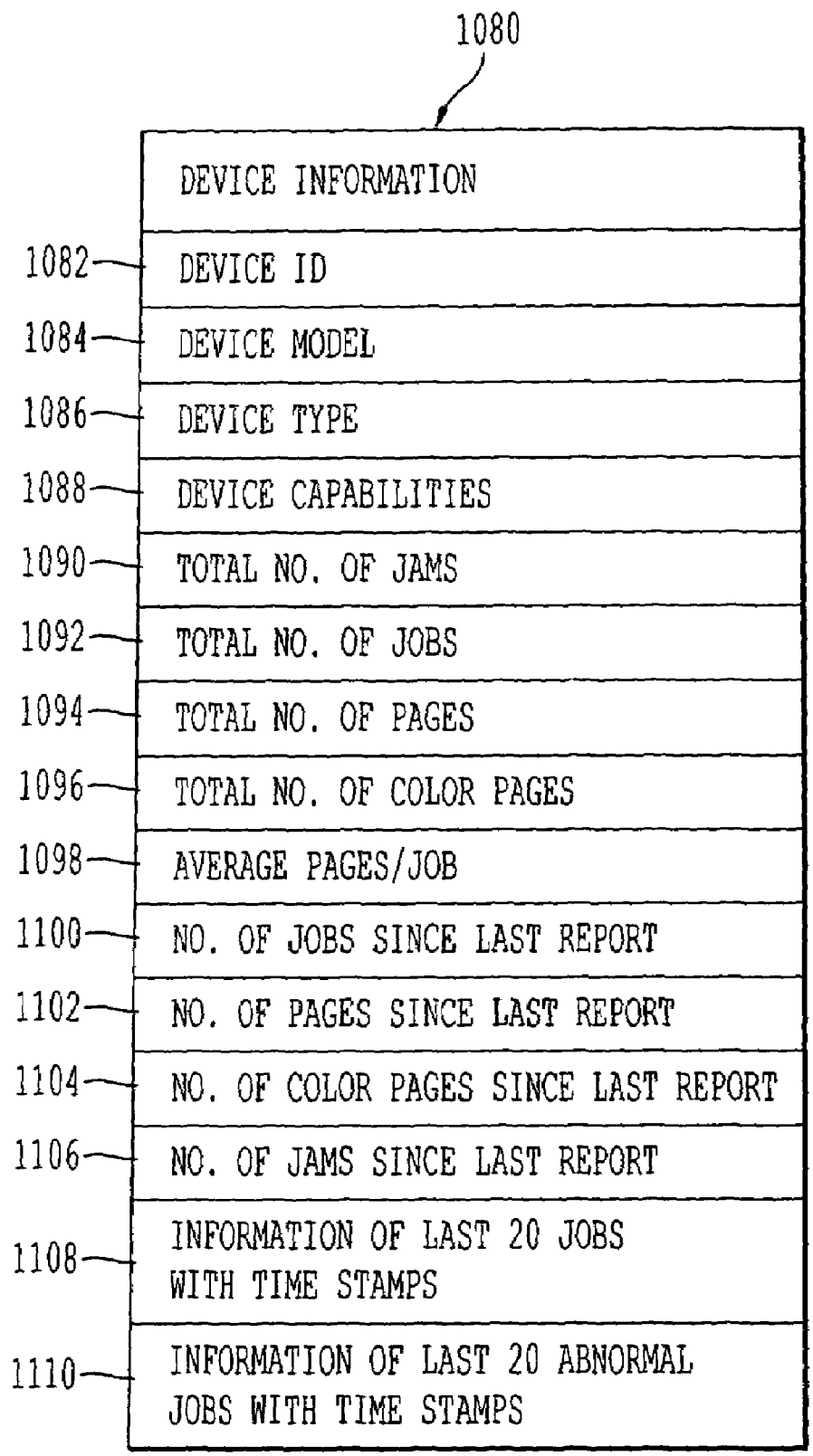
FIG. 25 illustrates a data structure containing device information.

FIG. 25 illustrates a data structure 1080 containing device information. This is information which is preferably transmitted from the device to the computer and/or from the computer out to a network using an e-mail format. FIG. 25 is an exemplary format and any desired format or information of the attached device which is of interest may be transmitted. The data structure 1080 illustrated in FIG. 25 includes a device identification 1082, a model of the device 1084, a device type 1086 which indicates information such as whether the device is a scanner, digital copier, printer, fax machine, multifunction device, or any other information regarding the type of the device. Field 1088 illustrates the capabilities of the device such as the optional equipment and capabilities of the device such as the type of output trays (e.g., a sorter), or whether the device has an automatic document feeder, for example, as explained in the related applications and patents. Further, information relating to the operation of the device may be transmitted. The information illustrated in FIG. 25 relates to a printer, copier, or multifunction device, and different information may be utilized for different types of devices. Exemplary information which may be included in the device information data structure 1080 include a total number of page or paper jams 1090, a total number of jobs which were performed 1092, a total number of pages printed 1094, a total number of color pages printed 1096 which is applicable only to color printers or devices, an average number of pages per job 1098, a number of jobs since the last report 1100, a number of pages since the last report 1102, a number of color pages since the last report 1104, a field 1108 which stores information of the last 20 jobs including the time stamps related to when these jobs occurred, and a field 1110 which includes information of the last 20 abnormal jobs (e.g., jobs which did not finish in accordance with normal or standard procedures) including the time stamps of when these jobs or abnormalities occurred, if desired.

The present invention may be utilized to create informational reports regarding status or other information of the device which is being monitored. The information of the devices may be transmitted over the Internet to another company or to a computer of the same company, or alternatively may be transmitted as an e-mail which remains within the private network such as the local area network or a wide area network of a company. A machine which receives e-mail messages prepared and transmitted in accordance with the teachings of this invention may be transmitted to a device such as the service machine 254 illustrated in FIG. 5 or the Service Machine of the Service Center 502 illustrated in FIG. 11. The service machine may then notify an appropriate entity such as a third party service center, a service center of the device manufacturer such as the copier or printer manufacturer's service center or other authorized service center, or any other entity and indicate that a specific problem exists. Such notification may be performed through electronic mail, through a direct computer connection, through a telephone call to a person using a facsimile transmission, through the indication of a voice message, or in any other desired manner.

FIG. 26 illustrates a log 1120 of collected data from various machines which indicates a problem with the machine. The log contains the identification of the machine which is having the problem, the location of the machine, the particular problem with the machine, and the entity which has been notified. The information which is received and transmitted in accordance with the log of FIG. 26 may operate in accordance with the teachings of any of the cross-referenced applications. The log may be generated at and/or stored in any of the computers of FIGS. 5, 10 or 1, for example.

FIG. 27 illustrates an example of data 1130 which has been collected through an inquiry. The inquiry in the example of FIG. 27 may be utilized to indicate the total number of installed machines of a particular model (e.g., the FT 6650), the number of these devices having a sorter, the average of number of copies per job per machine, and the average use of the sorter. Any other desired information may also be included in the status report. The status report may be generated at and/or stored in any of the computers of FIG. 5, for example.

FIG. 28 illustrates a customer intranet 1140 with a Facility Manager PC 1144 generating a monthly report 1146. The customer intranet 1140 is connected, through a firewall 1148, to the Internet 10, and to a database 1142. This report could have been generated for a computer network having four printers and three copiers which are located on the customer intranet 1140. The report was preferably generated according to the teachings of this invention using e-mail messages, although the report could have been generated using the techniques described in the cross-referenced applications, if desired. This type of report allows in-company monitoring of machines which are connected to a network or intranet and the computer maintaining information and statistics about the machines attached to the network may be part of the network, whether it be a local area network, wide area network, or across the Internet, for example. Alternatively, the report could be generated for devices on a plurality of intranets by the Facility Manager PC 1144 which stores appropriate information in the database 1142.

The present invention may be utilized to create informational reports regarding status or other information of the device which is being monitored. The information of the devices may be transmitted over the Internet to another company or to a computer of the same company, or alternatively may be transmitted as an e-mail which remains within the private network such as the local area network or a wide area network of a company. A machine which receives e-mail messages prepared and transmitted in accordance with the teachings of this invention may be transmitted to a device such as the service machine 254 illustrated in FIG. 5 or the Service Machine of the Service Center 502 illustrated in FIG. 11. The service machine may then notify an appropriate entity such as a third party service center, a service center of the device manufacturer such as the copier or printer manufacturer's service center or other authorized service center, or any other entity and indicate that a specific problem exists. Such notification may be performed through electronic mail, through a direct computer connection, through a telephone call to a person using a facsimile transmission, through the indication of a voice message, or in any other desired manner.

In its preferred implementation, the present invention utilizes computers having separate housings than the device to which they are attached. This would allow the invention to be inexpensively implemented for installations which already have an existing computer for performing the desired processing as the new hardware costs may be reduced. Such an arrangement may also permit implementation of the invention without hardware changes to the device. However, if desired, the present invention may be implemented by including the appropriate processing and data storage capabilities in the device which is being monitored and/or controlled in addition to or as an alternative to a separate computer connected to the device. Further, this invention may be particularly applicable to existing installations such as a print server. A print server is connected to a computer network and receives requests to perform printing operations and distributes these printing operations to appropriate printing devices connected to the print server.

This application relates to and builds on various concepts which have been disclosed in the cross-referenced patents and patent applications which have been incorporated into this application by reference. This patent application is intended to include not only the inventions disclosed in the related applications, but also the combinations of various features and functions of the individual embodiments which have been disclosed in this and each of the related applications. Thus, a feature disclosed in one of the related applications or patents may be readily applied to a concept disclosed in this invention, and also, the concepts disclosed in one or more of the other applications may be applied to concepts or features disclosed in other(s) of the applications. Further, an e-mail message may be used for only one of sending and receiving, with communication in the other direction being performed using a different mode of communication, such as one of the other communication modes disclosed herein, or a communication mode disclosed in the related patents and patent applications.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise then as specifically described herein.

The invention claimed is:

1. A method of monitoring an image handling device communicatively coupled to the Internet, comprising:
   obtaining, by a first monitoring computer over the Internet, device information of the image handling device, the device information including (1) status information obtained from sensors of the image handling device, and (2) a device identification of the image handling device;
   storing, by the first monitoring computer, the obtained device information;
   processing the stored device information by the first monitoring computer to generate a period usage report for the image handling device, wherein the period usage report is based on the status information obtained over a predetermined period of time;
   transmitting the usage report over the Internet from the first monitoring computer to a second monitoring computer; and
   receiving the usage report by the second monitoring computer,
   wherein the first monitoring computer is remote from the image handling device, and the first monitoring computer is the first computer to obtain the device information from the image handling device.

2. The method of claim 1, wherein the transmitting step comprises:
   transmitting the usage report to the second monitoring computer at a predetermined time or upon the occurrence of a predetermined event.

3. The method of claim 1, wherein the image handling device is a copier, and the usage report includes a number of copies made by the copier over the predetermined period.

4. The method of claim 1, further comprising:
   translating the usage report into HTML or Excel format.

5. The method of claim 1, wherein the processing step comprises:
   processing the stored device information to generate the period usage report on one of a monthly and a weekly basis.

6. The method of claim 1, wherein the second monitoring computer and the image handling device are arranged in a same local area network.

7. A system for monitoring an image handling device communicatively coupled to the Internet, comprising:
   means for obtaining, by a first monitoring computer over the Internet, device information of the image handling device, the device information including (1) status information obtained from sensors of the image handling device, and (2) a device identification of the image handling device;
   means for storing, by the first monitoring computer, the obtained device information;
   means for processing the stored device information by the first monitoring computer to generate a period usage report for the image handling device, wherein the period usage report is based on the status information obtained over a predetermined period of time;
   means for transmitting the usage report over the Internet from the first monitoring computer to a second monitoring computer; and
   means for receiving the usage report by the second monitoring computer,
   wherein the first monitoring computer is remote from the image handling device, and the first monitoring computer is the first computer to obtain the device information from the image handling device.

8. The system of claim 7, wherein the means for transmitting comprises:
   means for transmitting the usage report to the second monitoring computer at a predetermined time or upon the occurrence of a predetermined event.

9. The system of claim 7, wherein the means for processing comprises:
   means for generating a usage report for a copier, the usage report including a number of copies made by the copier over the predetermined period.

10. The system of claim 7, further comprising:
    means for translating the usage report into HTML or Excel format.

11. The system of claim 7, wherein the means for processing comprises:

means for processing the stored device information to generate the period usage report on one of a monthly and a weekly basis.

12. A computer program product having a computer usable medium for monitoring an image handling device communicatively coupled to the Internet, comprising:
    instructions for obtaining, by a first monitoring computer over the Internet, device information of the image handling device, the device information including (1) status information obtained from sensors of the image handling device, and (2) a device identification of the image handling device;
    instructions for storing, by the first monitoring computer, the obtained device information;
    instructions for processing by the first monitoring computer the stored device information to generate a period usage report for the image handling device, wherein the period usage report is based on the status information obtained over a predetermined period of time;
    instructions for transmitting the usage report over the Internet from the first monitoring computer to a second monitoring computer; and
    instructions for receiving the usage report by the second monitoring computer,
    wherein the first monitoring computer is remote from the image handling device, and the first monitoring computer is the first computer to obtain the device information from the image handling device.

13. The computer program product of claim 12, wherein the instructions for transmitting comprise:
    instructions for transmitting the usage report to the second monitoring computer at a predetermined time or upon the occurrence of a predetermined event.

14. The computer program product of claim 12, wherein the image handling device is a copier, and the usage report includes a number of copies made by the copier over the predetermined period.

15. The computer program product of claim 12, further comprising:
    instructions for translating the usage report into HTML or Excel format.

16. The computer program product of claim 12, wherein the processing step comprises:
    processing the stored device information to generate the period usage report on one of a monthly and a weekly basis.

* * * * *